(12) United States Patent
Lau et al.

(10) Patent No.: US 10,104,913 B2
(45) Date of Patent: Oct. 23, 2018

(54) POD ASSEMBLY, DISPENSING BODY, AND E-VAPOR APPARATUS INCLUDING THE SAME

(71) Applicants: Raymond Lau, Richmond, VA (US);
Eric Hawes, Midlothian, VA (US);
Alistair Bramley, Richmond, VA (US)

(72) Inventors: Raymond Lau, Richmond, VA (US);
Eric Hawes, Midlothian, VA (US);
Alistair Bramley, Richmond, VA (US)

(73) Assignee: Altria Client Services LLC, Richmond, VA (US)

(*) Notice: Subject to any disclaimer, the term of this patent is extended or adjusted under 35 U.S.C. 154(b) by 59 days.

(21) Appl. No.: 15/334,989

(22) Filed: Oct. 26, 2016

(65) Prior Publication Data

US 2017/0042246 A1    Feb. 16, 2017

Related U.S. Application Data

(63) Continuation-in-part of application No. 14/998,020, filed on Apr. 22, 2015.

(51) Int. Cl.
*A24F 47/00* (2006.01)
*B65D 25/02* (2006.01)
(Continued)

(52) U.S. Cl.
CPC ............ *A24F 47/008* (2013.01); *B65D 25/02* (2013.01); *B65D 25/04* (2013.01); *B65D 25/38* (2013.01);
(Continued)

(58) Field of Classification Search
CPC .................................. A24F 47/00; A61M 15/06
See application file for complete search history.

(56) References Cited

U.S. PATENT DOCUMENTS

D112,702 S    12/1938   Kirsten
D217,841 S     6/1970   Bulger et al.
(Continued)

FOREIGN PATENT DOCUMENTS

CN    303417607 S    10/2015
CN    106820274 A     6/2017
(Continued)

OTHER PUBLICATIONS

Web address http://www.my7s.com/faq, 7's electronic cigarettes, Electronic Vapor.
(Continued)

*Primary Examiner* — Cynthia Szewczyk
(74) *Attorney, Agent, or Firm* — Harness, Dickey & Pierce, P.L.C.

(57) ABSTRACT

An e-vapor apparatus may include a pod assembly and a dispensing body configured to receive the pod assembly. A vaporizer may be disposed in the pod assembly and/or the dispensing body. The pod assembly may include a pre-vapor formulation compartment, a device compartment, and a vapor channel extending from the device compartment and traversing the pre-vapor formulation compartment. The pod assembly is a smart pod configured to receive, store, and transmit information that can be communicated with the dispensing body and/or another electronic device. The proximal portion of the dispensing body includes a vapor passage and a through-hole. The vapor passage may extend from an end surface of the proximal portion to a side wall of the through-hole. The through-hole is configured to receive the pod assembly such that the vapor channel of the pod assembly is aligned with the vapor passage of the dispensing body.

20 Claims, 44 Drawing Sheets

(51) Int. Cl.
  *B65D 25/04* (2006.01)
  *B65D 25/38* (2006.01)
  *G06F 21/44* (2013.01)
  *H05B 1/02* (2006.01)
  *H05B 3/12* (2006.01)

(52) U.S. Cl.
  CPC ........... *G06F 21/44* (2013.01); *H05B 1/0297* (2013.01); *H05B 3/12* (2013.01)

(56) References Cited

U.S. PATENT DOCUMENTS

| | | |
|---|---|---|
| 3,998,232 A | 12/1976 | Smith |
| 4,686,353 A | 8/1987 | Spector |
| D301,618 S | 6/1989 | Barros |
| 5,666,977 A | 9/1997 | Higgins et al. |
| D424,739 S | 5/2000 | Ross |
| D438,459 S | 3/2001 | Holthaus |
| D446,499 S | 8/2001 | Andre et al. |
| D552,230 S | 10/2007 | Collins et al. |
| D562,761 S | 2/2008 | Ueda et al. |
| D569,794 S | 5/2008 | Zhang et al. |
| D588,741 S | 3/2009 | Murdaugh, III et al. |
| D623,129 S | 9/2010 | Kawakami et al. |
| D643,807 S | 8/2011 | Jiang |
| D650,520 S | 12/2011 | Timmermans |
| D650,737 S | 12/2011 | Hamilton |
| D663,686 S | 7/2012 | Yang |
| D664,920 S | 8/2012 | Huang |
| D665,346 S | 8/2012 | Kumagai et al. |
| D665,734 S | 8/2012 | Fitch et al. |
| D672,714 S | 12/2012 | Brandys et al. |
| D682,197 S | 5/2013 | Leung |
| D683,626 S | 6/2013 | Beck et al. |
| D686,153 S | 7/2013 | Qu |
| D689,818 S | 9/2013 | Sasada |
| D693,053 S | 11/2013 | Chen |
| D694,488 S | 11/2013 | Chen |
| 8,689,804 B2 | 4/2014 | Fernando et al. |
| 8,707,965 B2 | 4/2014 | Newton |
| D705,719 S | 5/2014 | Wong |
| D720,094 S | 12/2014 | Alima |
| D720,497 S | 12/2014 | Alima |
| D720,884 S | 1/2015 | Liu |
| D723,215 S | 2/2015 | Chen |
| D723,216 S | 2/2015 | Chen |
| 8,955,522 B1 | 2/2015 | Bowen et al. |
| D725,588 S | 3/2015 | Iaconis et al. |
| D727,566 S | 4/2015 | Xiao |
| D730,282 S | 5/2015 | Miller et al. |
| D733,050 S | 6/2015 | Chiang |
| D738,038 S | 9/2015 | Smith |
| D750,321 S | 2/2016 | Chen |
| 9,247,773 B2 | 2/2016 | Memari et al. |
| D751,984 S | 3/2016 | Lin |
| D752,286 S | 3/2016 | Doster |
| D758,651 S | 6/2016 | Wu |
| D759,303 S | 6/2016 | Afridi |
| D760,429 S | 6/2016 | Emarlou |
| D760,645 S | 7/2016 | Chen |
| D760,948 S | 7/2016 | Eksouzian |
| D764,703 S | 8/2016 | Liu |
| D768,068 S | 10/2016 | Chen |
| D770,678 S | 11/2016 | Shin |
| D771,308 S | 11/2016 | Saydar et al. |
| D773,115 S | 11/2016 | Liu |
| D774,247 S | 12/2016 | Chen |
| D775,762 S | 1/2017 | Chen |
| D776,869 S | 1/2017 | Heidl |
| D778,492 S | 2/2017 | Liu |
| D778,493 S | 2/2017 | Scott |
| D784,610 S | 4/2017 | Bosch |
| D788,697 S | 6/2017 | Verleur et al. |
| D790,122 S | 6/2017 | Hawes et al. |
| D790,123 S | 6/2017 | Beer et al. |
| D792,644 S | 7/2017 | Jordan et al. |
| D796,112 S | 8/2017 | Lafferty et al. |
| D799,748 S | 10/2017 | Freese |
| D799,749 S | 10/2017 | Freese |
| 9,833,021 B2 | 12/2017 | Perez et al. |
| 2005/0268911 A1 | 12/2005 | Cross et al. |
| 2008/0023003 A1 | 1/2008 | Rosenthal |
| 2009/0293888 A1 | 12/2009 | Williams et al. |
| 2011/0011396 A1 | 1/2011 | Fang |
| 2011/0036346 A1* | 2/2011 | Cohen ............... A61M 15/0065 128/200.14 |
| 2012/0318882 A1* | 12/2012 | Abehasera ........... A61M 11/041 239/1 |
| 2013/0042865 A1 | 2/2013 | Monsees et al. |
| 2013/0081642 A1 | 4/2013 | Safari |
| 2013/0167853 A1 | 7/2013 | Liu |
| 2013/0192615 A1 | 8/2013 | Tucker et al. |
| 2013/0213418 A1 | 8/2013 | Tucker et al. |
| 2013/0220315 A1 | 8/2013 | Conley et al. |
| 2013/0298905 A1 | 11/2013 | Levin et al. |
| 2014/0144453 A1 | 5/2014 | Capuano et al. |
| 2014/0150785 A1 | 6/2014 | Malik et al. |
| 2014/0202474 A1 | 7/2014 | Peleg et al. |
| 2014/0251326 A1 | 9/2014 | Terry et al. |
| 2015/0040929 A1 | 2/2015 | Hon |
| 2015/0108019 A1 | 4/2015 | Liu |
| 2015/0114410 A1 | 4/2015 | Doster |
| 2015/0189919 A1 | 7/2015 | Liu |
| 2015/0208729 A1 | 7/2015 | Monsees et al. |
| 2015/0237918 A1 | 8/2015 | Liu |
| 2015/0313287 A1 | 11/2015 | Verleur et al. |
| 2015/0328415 A1 | 11/2015 | Minskoff et al. |
| 2015/0351456 A1 | 12/2015 | Johnson et al. |
| 2016/0120218 A1 | 5/2016 | Schennum et al. |

FOREIGN PATENT DOCUMENTS

| | | |
|---|---|---|
| CN | 206413749 U | 8/2017 |
| EP | 0 640297 A1 | 3/1995 |
| EP | 002337410-0013 | 11/2013 |
| JP | 1584539 S | 8/2017 |
| RU | 00104198 | 7/2017 |
| WO | WO-2013/040193 A2 | 3/2013 |
| WO | WO-2014/066730 A1 | 5/2014 |
| WO | WO-2014110119 A1 | 7/2014 |
| WO | WO-2014207719 A1 | 12/2014 |
| WO | WO-2015/197165 A1 | 12/2015 |

OTHER PUBLICATIONS

International Search Report dated Jun. 23, 2016, issued in corresponding International Application No. PCT/US2016/028048.
Written Opinion of the International Searching Authority dated Jun. 23, 2016, issued in corresponding International Application No. PCT/US2016/028048.
U.S. Office Action dated Jun. 5, 2017 for co-pending U.S. Appl. No. 14/998,020.
Office Action for corresponding U.S. Appl. No. 14/998,020 dated Dec. 21, 2017.
Viva—retrieved on Sep. 18, 2017 at https://cdn.shopify.com/s/files/1/1203/8500/products/viva-vaporizer-01_large.jpg?v=1480032844.
ALD—retrived Sep. 18, 2017 at https://ae01.alicdn.com/kf/HTB1gMOmPFXXXXbdXpXXq6xXFXXXR/ALD-AMAZE-dry-herb-vaporizer-font-b-kit-b-font-smoke-herbal-electronic-cigarette-vaporizer-portable.jpg.
International Search Report and Written Opinion for Application No. PCT/US2016/028048 dated Nov. 2, 2017.
VaporDNA by VaporDNA dated 2013-2018, found online https://www.vapordna.com/SMPO-Ultra-Portable-Kit-p/smpoup.htm?Click=40939.
Notice of Allowance for corresponding U.S. Appl. No. 15/601,365 dated Mar. 2, 2018.

* cited by examiner

802

POD ASSEMBLY, DISPENSING BODY, AND E-VAPOR APPARATUS INCLUDING THE SAME

CROSS-REFERENCE TO RELATED APPLICATION

The present application is a continuation-in-part under 35 U.S.C. § 120 of U.S. application Ser. No. 14/998,020 (formerly U.S. Provisional Application No. 62/151,148), filed Apr. 22, 2015, the entire contents of which is hereby incorporated herein by reference.

BACKGROUND

Field

The present disclosure relates to electronic vapor devices including self-contained articles including pre-vapor formulations.

Description of Related Art

Some e-vapor devices include a first section coupled to a second section via a threaded connection. The first section may be a replaceable cartridge, and the second section may be a reusable fixture. The threaded connection may be a combination of a male threaded member on the first section and a female threaded receiver on the second section. The first section includes an outer tube (or housing) extending in a longitudinal direction and an inner tube within the outer tube. The inner tube may be coaxially positioned within the outer tube. The second section may also include the outer tube (or housing) extending in a longitudinal direction. The e-vapor device includes a central air passage defined in part by the inner tube and an upstream seal. Additionally, the e-vapor device includes a reservoir. The reservoir is configured to hold a pre-vapor formulation and optionally a storage medium operable to store the pre-vapor formulation therein. The reservoir is contained in an outer annulus between the outer tube and the inner tube. The outer annulus is sealed by the seal at an upstream end and by a stopper at a downstream end so as to prevent leakage of the pre-vapor formulation from the reservoir.

SUMMARY

An e-vapor apparatus may include a pod assembly, a dispensing body configured to receive the pod assembly, and/or a vaporizer disposed in at least one of the pod assembly and the dispensing body. The pod assembly may include a pre-vapor formulation compartment, a device compartment, and a vapor channel extending from the device compartment and traversing the pre-vapor formulation compartment. The pre-vapor formulation compartment is configured to hold a pre-vapor formulation therein. The dispensing body includes a proximal portion and an opposing distal portion. The proximal portion includes a vapor passage and a through-hole. The vapor passage may extend from an end surface of the proximal portion to a side wall of the through-hole. The through-hole may be between the vapor passage and the distal portion of the dispensing body. The through-hole is configured to receive the pod assembly. The vaporizer may be disposed in at least one of the pod assembly and the dispensing body. The pre-vapor formulation compartment of the pod assembly is configured to be in fluidic communication with the vaporizer during an operation of the e-vapor apparatus such that the pre-vapor formulation from the pre-vapor formulation compartment comes into thermal contact with the vaporizer. The vaporizer is configured to heat the pre-vapor formulation to produce a vapor that passes through the pod assembly via the vapor channel. The through-hole of the dispensing body is configured to receive the pod assembly such that the vapor channel of the pod assembly is aligned with the vapor passage of the dispensing body so as to facilitate a delivery of the vapor through the vapor passage of the dispensing body.

The pre-vapor formulation compartment of the pod assembly may surround the vapor channel. For example, the vapor channel may pass through a center of the pre-vapor formulation compartment.

Alternatively, the vapor channel may be in a form of a pathway that is arranged along at least one sidewall of the pre-vapor formulation compartment. For example, the vapor channel may be in a form of a conduit that is arranged in at least one corner of the pre-vapor formulation compartment. The conduit may be arranged in at least two corners of the pre-vapor formulation compartment and configured to converge at a position that is aligned with the vapor passage of the dispensing body when the pod assembly is received in the through-hole.

The pre-vapor formulation compartment and the device compartment may be at opposite ends of the pod assembly. The device compartment of the pod assembly may include a memory device. The memory device may be coded with an electronic identity to permit at least one of an authentication of the pod assembly and a pairing of operating parameters specific to a type of the pod assembly when the pod assembly is inserted into the through-hole of the dispensing body. The memory device may also receive and store information such as operational parameters and usage history from the dispensing body. Once stored, such information in the memory device will remain intact even when the pod is detached from the dispensing body.

The pod assembly may include a side surface having at least one electrical contact. The dispensing body may be configured to perform at least one of supply power to and communicate with the pod assembly via the at least one electrical contact. The at least one electrical contact may be at an end of the pod assembly corresponding to the device compartment.

The dimensions of the through-hole correspond to dimensions of the pod assembly. The proximal portion of the dispensing body may include a mouthpiece that includes the vapor passage. The vapor channel may be between the mouthpiece and the device compartment when the pod assembly is inserted into the through-hole of the dispensing body. The e-vapor apparatus may further include an attachment structure on at least one of the side wall of the through-hole and a side surface of the pod assembly. The attachment structure is configured to engage and hold the pod assembly upon insertion into the through-hole of the dispensing body. The attachment structure enables the pod assembly to be inserted and extracted from the dispensing body by the adult vaper with ease. The attachment structure also aligns and secures the pod assembly in place in the dispensing body during normal use of the e-vapor apparatus.

A pod assembly for an e-vapor apparatus may include a pre-vapor formulation compartment configured to hold a pre-vapor formulation therein; a device compartment configured to be in fluidic communication with the pre-vapor formulation compartment; and a vapor channel extending from the device compartment and traversing the pre-vapor formulation compartment. The device compartment may include a vaporizer. The device compartment may also include a memory device. A side surface of the pod assembly may include at least one electrical contact.

A pod assembly for an e-vapor apparatus may also include a pre-vapor formulation compartment configured to hold a pre-vapor formulation therein; a vaporizer configured to be in fluidic communication with the pre-vapor formulation compartment; and a vapor channel extending from the vaporizer and traversing the pre-vapor formulation compartment.

BRIEF DESCRIPTION OF THE DRAWINGS

The various features and advantages of the non-limiting embodiments herein may become more apparent upon review of the detailed description in conjunction with the accompanying drawings. The accompanying drawings are merely provided for illustrative purposes and should not be interpreted to limit the scope of the claims. The accompanying drawings are not to be considered as drawn to scale unless explicitly noted. For purposes of clarity, various dimensions of the drawings may have been exaggerated.

DETAILED DESCRIPTION

Figure 1:
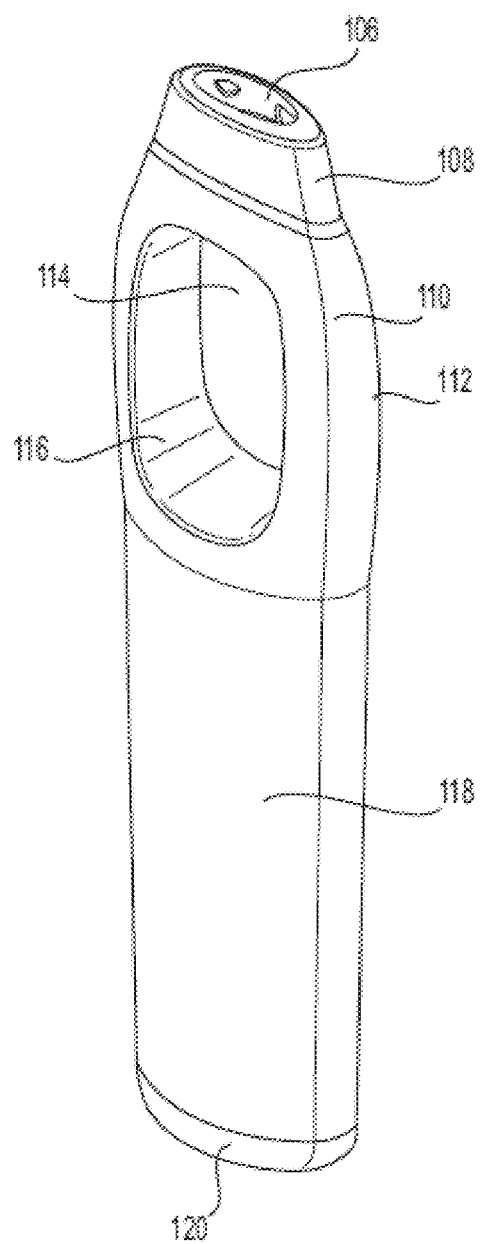
FIG. 1 is a perspective view of a dispensing body of an e-vapor apparatus according to an example embodiment.

It should be understood that when an element or layer is referred to as being on, "connected to," "coupled to," or "covering" another element or layer, it may be directly on, connected to, coupled to, or covering the other element or layer or intervening elements or layers may be present. In contrast, when an element is referred to as being "directly on," "directly connected to," or "directly coupled to" another element or layer, there are no intervening elements or layers present. Like numbers refer to like elements throughout the specification. As used herein, the term "and/or" includes any and all combinations of one or more of the associated listed items.

It should be understood that, although the terms first, second, third, etc. may be used herein to describe various elements, components, regions, layers and/or sections, these elements, components, regions, layers, and/or sections should not be limited by these terms. These terms are only used to distinguish one element, component, region, layer, or section from another region, layer, or section. Thus, a first element, component, region, layer, or section discussed below could be termed a second element, component, region, layer, or section without departing from the teachings of example embodiments.

Spatially relative terms (e.g., "beneath," "below," "lower," "above," "upper," and the like) may be used herein for ease of description to describe one element or feature's relationship to another element(s) or feature(s) as illustrated in the figures. It should be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" may encompass both an orientation of above and below. The device may be otherwise oriented (rotated 90 degrees or at other orientations) and the spatially relative descriptors used herein interpreted accordingly.

The terminology used herein is for the purpose of describing various embodiments only and is not intended to be limiting of example embodiments. As used herein, the singular forms "a," an, and the are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the shapes of regions illustrated herein but are to include deviations in shapes that result, for example, from manufacturing. The regions illustrated in the figures are schematic in nature and their shapes are not intended to illustrate the actual shape of a region of a device and are not intended to limit the scope of example embodiments.

Unless otherwise defined, all terms (including technical and scientific terms) used herein have the same meaning as commonly understood by one of ordinary skill in the art to which example embodiments belong. It will be further understood that terms, including those defined in commonly used dictionaries, should be interpreted as having a meaning that is consistent with their meaning in the context of the relevant art and will not be interpreted in an idealized or overly formal sense unless expressly so defined herein.

FIG. 1 is a perspective view of a dispensing body of an e-vapor apparatus according to an example embodiment. Referring to FIG. 1, a dispensing body 104 of an e-vapor apparatus includes a frame portion that is connected to a body portion 118. The frame portion includes a first frame 110 and a second frame 112. The side walls 116 (e.g., inner side surfaces) of the first frame 110 and the second frame 112 define a through-hole 114. The through-hole 114 is configured to receive a pod assembly (which will be subsequently discussed in detail).

Generally, an e-vapor apparatus may include the dispensing body 104, a pod assembly inserted in the through-hole 114 of the dispensing body 104, and a vaporizer disposed in at least one of the pod assembly and the dispensing body 104. The pod assembly may include a pre-vapor formulation compartment (e.g., liquid compartment), a device compartment, and a vapor channel. The vapor channel may extend from the device compartment and traverse the pre-vapor formulation compartment. The pre-vapor formulation compartment is configured to hold a pre-vapor formulation (e.g., e-liquid) therein. A pre-vapor formulation is a material or combination of materials that may be transformed into a vapor. For example, the pre-vapor formulation may be a liquid, solid, and/or gel formulation including, but not limited to, water, beads, solvents, active ingredients, ethanol, plant extracts, natural or artificial flavors, and/or vapor formers such as glycerine and propylene glycol.

The dispensing body 104 includes a proximal portion and an opposing distal portion. The mouthpiece 108 is disposed at the proximal portion, while the end piece 120 is disposed at the distal portion. The proximal portion includes a vapor passage 106 and the through-hole 114. The vapor passage 106 extends from an end surface of the proximal portion to the side wall 116 of the through-hole 114. The vapor passage 106 is in the form of one or more passageways extending through the proximal portion of the dispensing body 104. The through-hole 114 is between the vapor passage 106 and the distal portion of the dispensing body 104 (e.g., between the mouthpiece 108 and the body portion 118).

A vaporizer (which will be subsequently discussed in more detail) is disposed in at least one of the pod assembly and the dispensing body 104. The pre-vapor formulation compartment of the pod assembly is configured to be in fluidic communication with the vaporizer during an operation of the e-vapor apparatus such that the pre-vapor formulation from the pre-vapor formulation compartment comes into thermal contact with the vaporizer. The vaporizer is configured to heat the pre-vapor formulation to produce a vapor that passes through the pod assembly via the vapor channel. The through-hole 114 of the dispensing body 104 is configured to receive the pod assembly such that the vapor channel of the pod assembly is aligned with the vapor passage 106 of the dispensing body 104 so as to facilitate a delivery of the vapor through the vapor passage 106 of the dispensing body 104.

Figure 2:
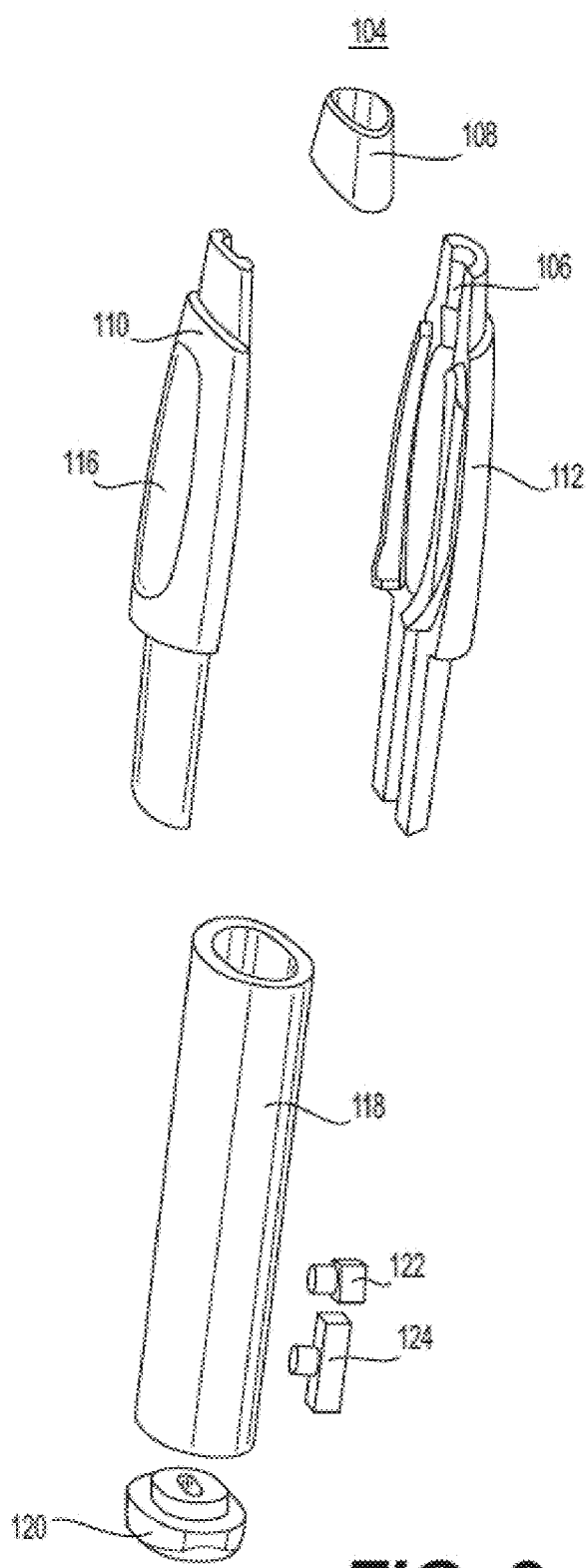
FIG. 2 is an exploded view of the dispensing body of FIG. 1.

FIG. 2 is an exploded view of the dispensing body of FIG. 1. Referring to FIG. 2, the first frame 110 and the second frame 112 are configured to unite to form the frame portion of the dispensing body 104. A number of options are available for uniting the first frame 110 and the second frame 112. In an example embodiment, the first frame 110 is a female member, while the second frame 112 is a male member that is configured to engage therewith. Alternatively, the first frame 110 may be a male member, while the second frame 112 may be a female member that is configured to engage therewith. The engagement of the first frame 110 and the second frame 112 may be via a snap-fit, friction-fit, or slide-lock type arrangement, although example embodiments are not limited thereto.

The first frame 110 may be regarded as the front frame of the dispensing body 104, and the second frame 112 may be regarded as the rear frame (or vice versa). Additionally, the proximal ends of the first frame 110 and the second frame 112, when united, define the vapor passage 106 therebetween. The vapor passage 106 may be in the form of a single passageway that is in communication with the through-hole 114 defined by the side wall 116. Alternatively, the vapor passage 106 may be in the form of a plurality of passageways that are in communication with the through-hole 114 defined by the side wall 116. In such an example, the plurality of passageways may include a central passageway surrounded by peripheral passageways (or just several evenly spaced passageways). Each of the plurality of passageways may independently extend from the through-hole 114 to the proximal end surface of the frame portion. Alternatively, a common passageway may extend partly from the through-hole 114 and then branch into a plurality of passageways that extend to the proximal end surface of the frame portion.

The mouthpiece 108 is configured to slip onto the proximal end of the frame portion that defines the vapor passage 106. As a result, the outer surface of the proximal end formed by the first frame 110 and the second frame 112 may correspond to an inner surface of the mouthpiece 108. Alternatively, the proximal end defining the vapor passage 106 may be integrally formed as part of the mouthpiece 108 (instead of being a part of the frame portion). The mouthpiece 108 may be secured via a snap-fit type or other suitable arrangement. In an example embodiment, the mouthpiece 108 is a removable element that is intended to permit voluntary, recommended, or required replacement by an adult vaper. For instance, the mouthpiece 108 may, in addition to its intended functionality, provide a visual or other sensory appeal to the adult vaper. In particular, the mouthpiece 108 may be formed of an ornamental material (e.g., wood, metal, ceramic) and/or include designs (e.g., patterns, images, characters). Thus, the mouthpiece 108 may be customized so as to provide an expression of personality and individuality by an adult vaper. In other instances, the removable nature of the mouthpiece 108 may facilitate a recommended replacement due to the amount of usage or a required replacement due to wear over time or damage (e.g., chipped mouthpiece 108 caused by accidental dropping of e-vapor apparatus).

The lower ends of the first frame 110 and the second frame 112 opposite the proximal ends (that define the vapor passage 106) are configured to insert into the body portion 118. To facilitate a secure fit, the outer surface of the lower ends of the first frame 110 and the second frame 112 may correspond to a receiving inner surface of the body portion 118. Additionally, the lower ends of the first frame 110 and the second frame 112 may also define a groove therebetween to accommodate one or more wires that connect to one or more electrical contacts provided in the side wall 116 (e.g., lower surface of the side wall 16 opposite the vapor passage 106). A power source (e.g., battery) may also be provided in the groove to supply the requisite current through the wire(s). Alternatively, the power source may be provided in an available space within the body portion 118 between the inserted lower end of the frame portion and the end piece 120.

A first button 122 and a second button 124 may be provided on the body portion 118 and connected to the corresponding circuitry and electronics therein. In an example embodiment, the first button 122 may be a power button, and the second button 124 may be a battery level indicator. The battery level indicator may display a representation of the amount of power available (e.g., 3 out of 4 bars). In addition, the battery level indicator may also blink and/or change colors to alert an adult vaper to recharge the e-vapor apparatus. To stop the blinking, an adult vaper may simply press the second button 124. Thus, the button(s) of the e-vapor apparatus may have a control and/or display function. It should be understood that the examples with regard to the first button 122 and the second button 124 are not intended to be limiting and can have different implementations depending on the desired functionalities. Accordingly, more than two buttons (and/or of different shapes) may be provided in the same proximity or at a different location on the e-vapor apparatus.

Figure 3:
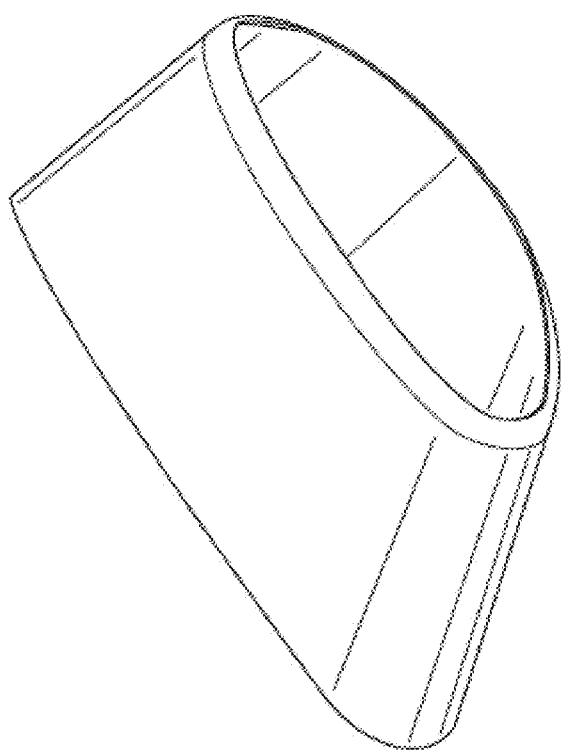
FIG. 3 is a perspective view of the mouthpiece of FIG. 2.

FIG. 3 is a perspective view of the mouthpiece of FIG. 2. Referring to FIG. 3, the mouthpiece 108 may be an open-ended cap-like structure that is configured to slip onto the proximal end of the frame portion defining the vapor passage 106. The mouthpiece 108 may have a wider base that tapers to a narrower top. However, it should be understood that example embodiments are not limited thereto. The mouthpiece 108 may also be shaped to better accommodate an adult vaper's mouth during the application of negative pressure. For instance, one side of the mouthpiece 108 may be more linear, while the opposing side may be more curved.

Figure 4:
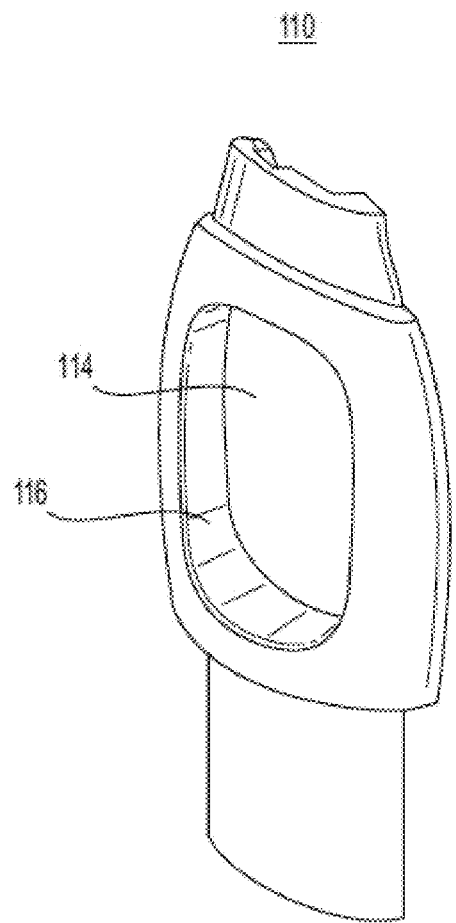
FIG. 4 is a perspective view of the first frame of FIG. 2.

FIG. 4 is a perspective view of the first frame of FIG. 2. Referring to FIG. 4, the first frame 110 includes a side wall 116 that defines a through-hole 114. The first frame 110 is configured to unite with the second frame 112, which also includes a side wall 116 defining a through-hole 114. Because the combined through-hole 114 is configured to receive a pod assembly, the side walls 116 of the first frame 110 and the second frame 112 may form a relatively smooth and continuous surface to facilitate the insertion of the pod assembly.

Figure 5:
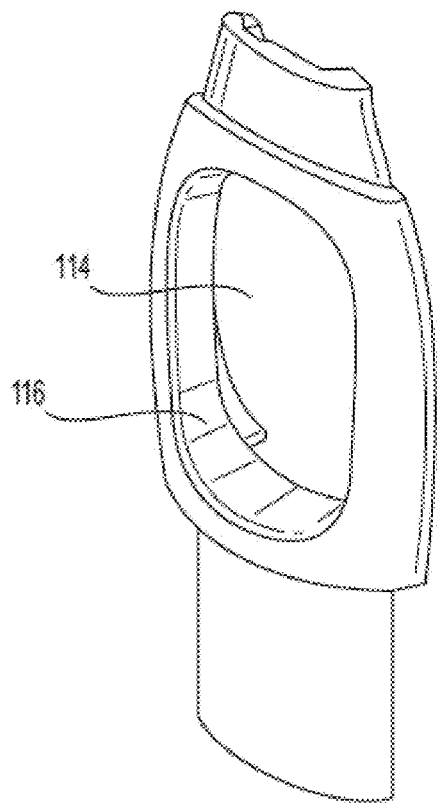
FIG. 5 is a perspective view of the second frame of FIG. 2.

FIG. 5 is a perspective view of the second frame of FIG. 2. Referring to FIG. 5, the second frame 112 is configured to unite with the first frame 110 such that the shape defined by the combined side walls 116 corresponds to the shape of the side surface of a pod assembly. In addition, an attachment structure (e.g., mating member/recess, magnetic arrangement) may be provided on at least one of the side walls 116 and the side surface of the pod assembly.

For example, the attachment structure may include a mating member that is formed on the side wall 116 (of the first frame 110 and/or second frame 112) and a corresponding recess that is formed on the side surface of the pod assembly. Conversely, the mating member may be formed on the side surface of the pod assembly, while the corresponding recess may be formed on the side wall 116 (of the first frame 110 and/or second frame 112). In a non-limiting embodiment, the mating member may be a rounded structure to facilitate the engagement/disengagement of the attachment structure, while the recess may be a concave indentation that corresponds to the curvature of the rounded structure. The mating member may also be spring-loaded so as to retract (via spring compression) when the pod assembly is being inserted into the through-hole 114 and protract (via spring decompression) when mating member becomes aligned with the corresponding recess. The engagement of the mating member with the corresponding recess may result in an audible sound (e.g., click), which notifies the adult vaper that the pod assembly is secured and properly positioned within the through-hole 114 of the dispensing body 104.

In another example, the attachment structure may include a magnetic arrangement. For instance, a first magnet may be arranged in the side wall 116 (of the first frame 110 and/or second frame 112), and a second magnet may be arranged in the side surface of the pod assembly. The first and/or second magnets may be exposed or hidden from view behind a layer of material. The first and second magnets are oriented so as to be attracted to each other, and a plurality of pairs of the first and second magnets may be provided to ensure that the pod assembly will be secure and properly aligned within the through-hole 114 of the dispensing body 104. As a result, when the pod assembly is inserted in the through-hole 114, the pair(s) of magnets (e.g., first and second magnets) will be attracted to each other and, thus, hold the pod assembly within the through-hole 114 while properly aligning the channel outlet of the pod assembly with the vapor passage 106 of the dispensing body 104.

Figure 6:
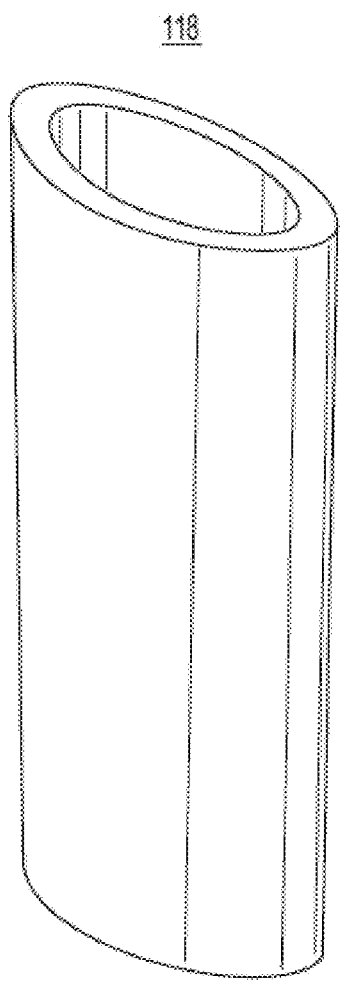
FIG. 6 is a perspective view of the body portion of FIG. 2.
Figure 7:
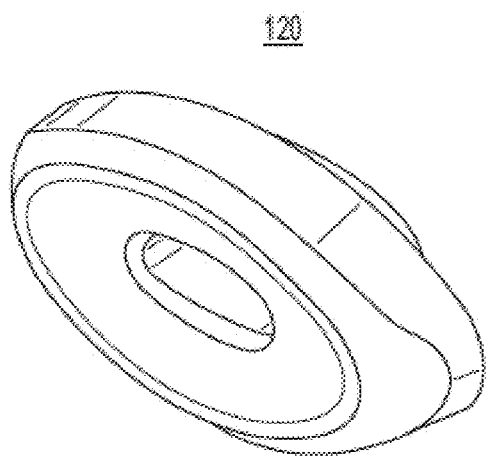
FIG. 7 is a perspective view of the end piece of FIG. 2.

FIG. 6 is a perspective view of the body portion of FIG. 2. Referring to FIG. 6, the body portion 118 may be a tube-like structure that constitutes a substantial segment of the dispensing body 104. The cross-section of the body portion 118 may be oval-shaped, although other shapes are possible depending on the structure of the frame portion. An adult vaper may hold the e-vapor apparatus by the body portion 118. Accordingly, the body portion 118 may be formed of (or covered with) a material that provides enhanced gripping and/or texture appeal to the fingers FIG. 7 is a perspective view of the end piece of FIG. 2. Referring to FIG. 7, the end piece 120 is configured to be inserted in the distal end of the body portion 118. The shape of the end piece 120 may correspond to the shape of the distal end of the body portion 118 so as to provide a relatively smooth and continuous transition between the two surfaces.

Figure 8:
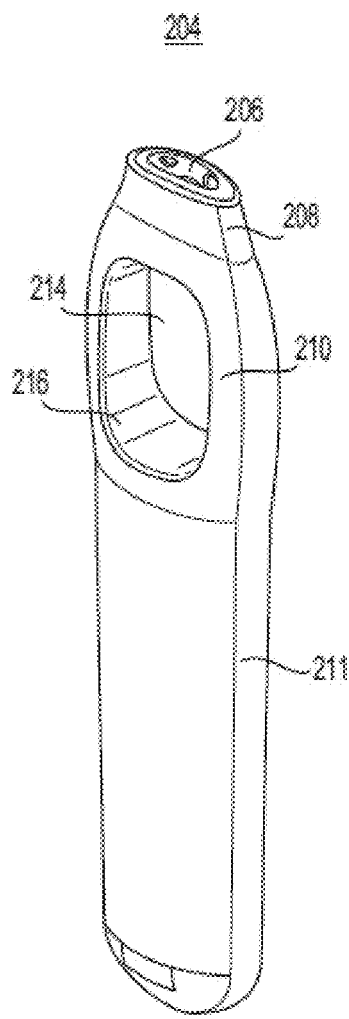
FIG. 8 is a perspective view of another dispensing body of an e-vapor apparatus according to an example embodiment.

FIG. 8 is a perspective view of another dispensing body of an e-vapor apparatus according to an example embodiment. Referring to FIG. 8, the dispensing body 204 includes a side wall 216 defining a through-hole 214 that is configured to receive a pod assembly. A substantial portion of the framework of the dispensing body 204 is provided by the first frame 210, the frame trim 211, and the second frame 212 (e.g., FIG. 9). A vapor passage 206 and a first mouthpiece 208 are provided at a proximal portion of the dispensing body 204.

Figure 9:
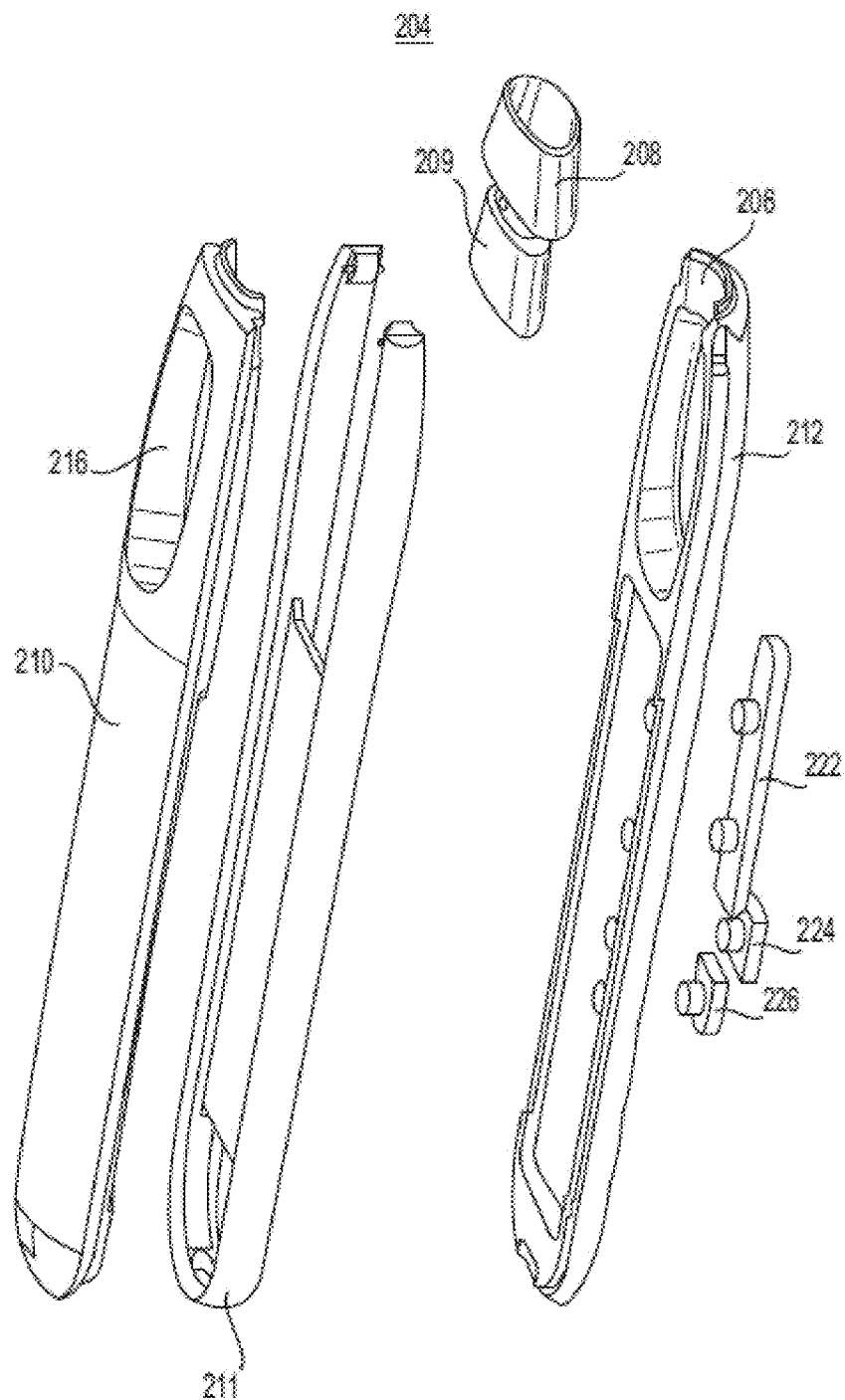
FIG. 9 is an exploded view of the dispensing body of FIG. 8.

FIG. 9 is an exploded view of the dispensing body of FIG. 8. Referring to FIG. 9, the frame trim 211 is sandwiched between the first frame 210 and the second frame 212. However, it should be understood that it is possible to modify and structure the first frame 210 and the second frame 212 such that the frame trim 211 is not needed. The vapor passage 206 may be defined by both the proximal ends of the first frame 210 and the second frame 212 as well as the second mouthpiece 209. As a result, the vapor passage 206 extends from the side wall 216 to the outlet end of the second mouthpiece 209. The first mouthpiece 208 is configured to slip onto the second mouthpiece 209. In an example embodiment, the first mouthpiece 208 may be structured to be removable, while the second mouthpiece 209 may be structured to be permanent. Alternatively, the first mouthpiece 208 may be integrated with the second mouthpiece 209 to form a single structure that is removable.

A first button 222, a second button 224, and a third button 226 may be provided on the second frame 212 of the dispensing body 204. In an example embodiment, the first button 222 may be a display (e.g., battery level indicator), the second button 224 may control an amount of pre-vapor formulation available to the heater, and the third button 226 may be the power button. However, it should be understood that example embodiments are not limited thereto. Notably, the buttons can have different implementations depending on the desired functionalities. Accordingly, a different number of buttons (and/or of different shapes) may be provided in the same proximity or at a different location on the e-vapor apparatus. Furthermore, the features and considerations in connection with the dispensing body 104 that are also applicable to the dispensing body 204 may be as discussed supra in connection with the dispensing body 104.

Figure 10:
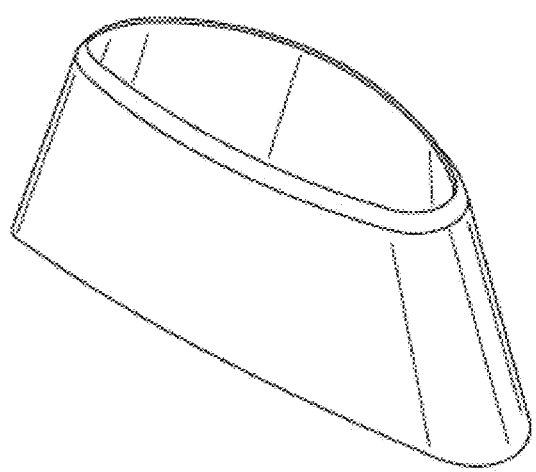
FIG. 10 is a perspective view of the first mouthpiece of FIG. 9.

FIG. 10 is a perspective view of the first mouthpiece of FIG. 9. Referring to FIG. 10, the first mouthpiece 208 is configured to fit over the second mouthpiece 209. Thus, the inner surface of the first mouthpiece 208 may correspond to an outer surface of the second mouthpiece 209.

Figure 11:
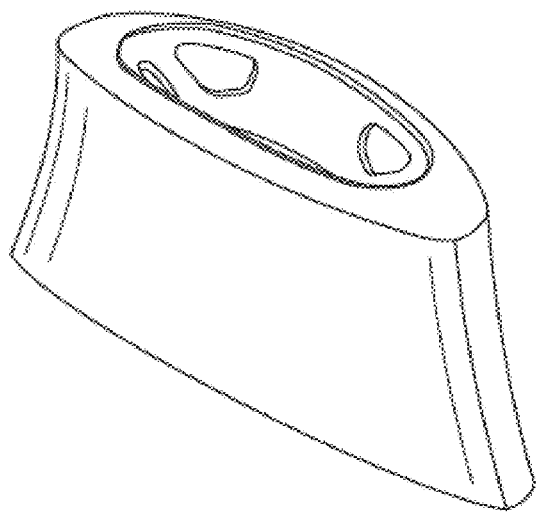
FIG. 11 is a perspective view of the second mouthpiece of FIG. 9.

FIG. 11 is a perspective view of the second mouthpiece of FIG. 9. Referring to FIG. 11, the second mouthpiece 209 defines a vapor passage 206 therein. The second mouthpiece 209 may resemble the combined proximal ends of the first frame 110 and the second frame 112 that define the vapor passage 106 of the dispensing body 104.

Figure 12:
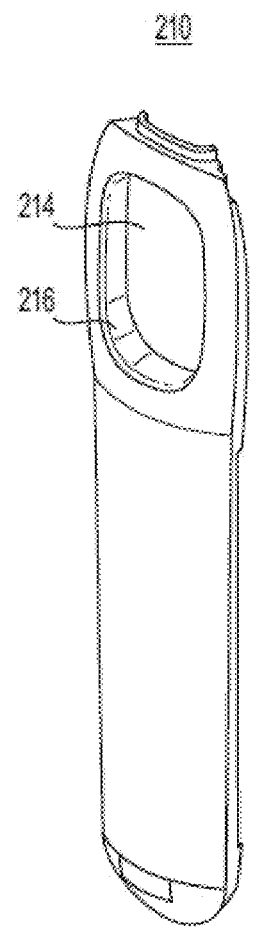
FIG. 12 is a perspective view of the first frame of FIG. 9.

FIG. 12 is a perspective view of the first frame of FIG. 9. Referring to FIG. 12, the first frame 210 includes a side wall 216 that defines a through-hole 214. The top end of the first frame 210 may include a connection structure that facilitates the connection of at least the second mouthpiece 209 thereto.

Figure 13:
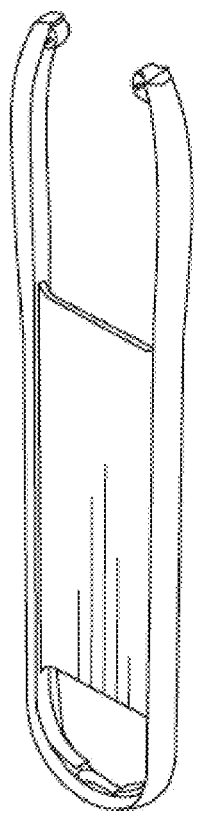
FIG. 13 is a perspective view of the frame trim of FIG. 9.

FIG. 13 is a perspective view of the frame trim of FIG. 9. Referring to FIG. 13, the frame trim 211 may be in the form of a curved strip that is supported by a central plate. When arranged between the first frame 210 and the second frame 212, the frame trim 211 forms a side surface of the dispensing body 204, although example embodiments are not limited thereto.

Figure 14:
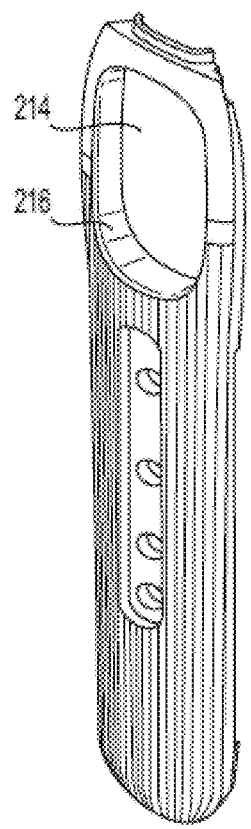
FIG. 14 is a perspective view of the second frame of FIG. 9.

FIG. 14 is a perspective view of the second frame of FIG. 9. Referring to FIG. 14, the second frame 212 includes a side wall 216 that defines a through-hole 214. The top end of the second frame 212 may include a connection structure that facilitates the connection of at least the second mouthpiece 209 thereto. In addition, the surface of the second frame 212 may be provided with a pattern or textured appearance. Such patterning and texturing may be aesthetic (e.g., visually appealing) and/or functional (e.g., enhanced grip) in nature. Although not shown, the surface of the first frame 210 may be similarly provided.

Figure 15:
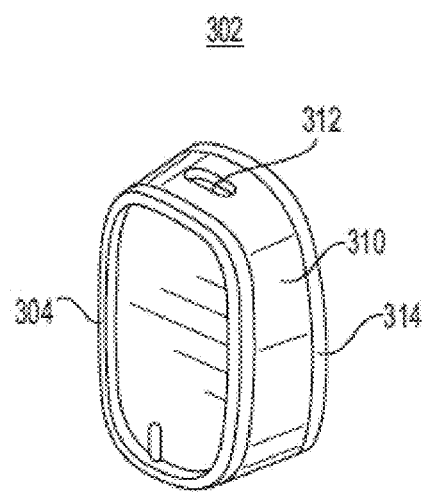
FIG. 15 is a perspective view of a pod assembly of an e-vapor apparatus according to an example embodiment.

FIG. 15 is a perspective view of a pod assembly of an e-vapor apparatus according to an example embodiment. Referring to FIG. 15, the pod assembly 302 includes a pod trim 310 that is arranged between a first cap 304 and a second cap 314. The first cap 304 may be regarded as a front cap, and the second cap 314 may be regarded as a rear cap (or vice versa). The first cap 304 and the second cap 314 may be formed of a transparent material to permit a viewing of the contents (e.g., pre-vapor formulation) in the pod assembly 302. The pod trim 310 defines a channel outlet 312 for the release of vapor generated within the pod assembly 302.

The pod assembly 302 is a self-contained article that can be sealed with a protective film that wraps around the pod trim 310. Additionally, because of the closed system nature of the pod assembly 302, the risk of tampering and contamination can be reduced. Also, the chance of unwanted physical exposure to the pre-vapor formulation within the pod assembly 302 (e.g., via a leak) can be reduced. Furthermore, the pod assembly 302 can be structured so as to prevent refilling.

Figure 16:
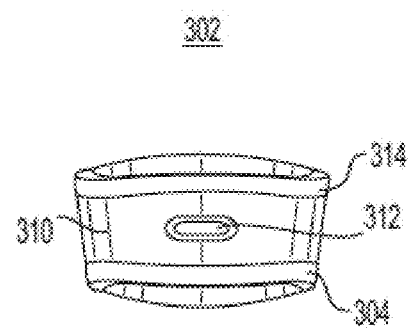
FIG. 16 is a top view of the pod assembly of FIG. 15.

FIG. 16 is a top view of the pod assembly of FIG. 15. Referring to FIG. 16, the second cap 314 is wider than the first cap 304. As a result, the pod trim 310 may slant outwards from the first cap 304 to the second cap 314. However, it should be understood that other configurations are possible depending on the design of the pod assembly 302.

Figure 17:
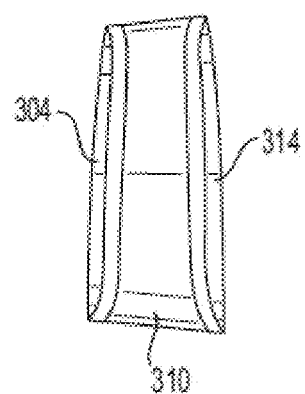
FIG. 17 is a side view of the pod assembly of FIG. 15.

FIG. 17 is a side view of the pod assembly of FIG. 15. Referring to FIG. 17, the second cap 314 is longer than the first cap 304. As a result, the pod trim 310 may slant outwards from the first cap 304 to the second cap 314. As a result, the pod assembly 302 may be inserted in a dispensing body such that the side corresponding to the first cap 304 is received in the through-hole first. In an example embodiment, the pod assembly 302 may be inserted in the through-hole 114 of the dispensing body 104 and/or the through-hole 214 of the dispensing body 204.

Figure 18:
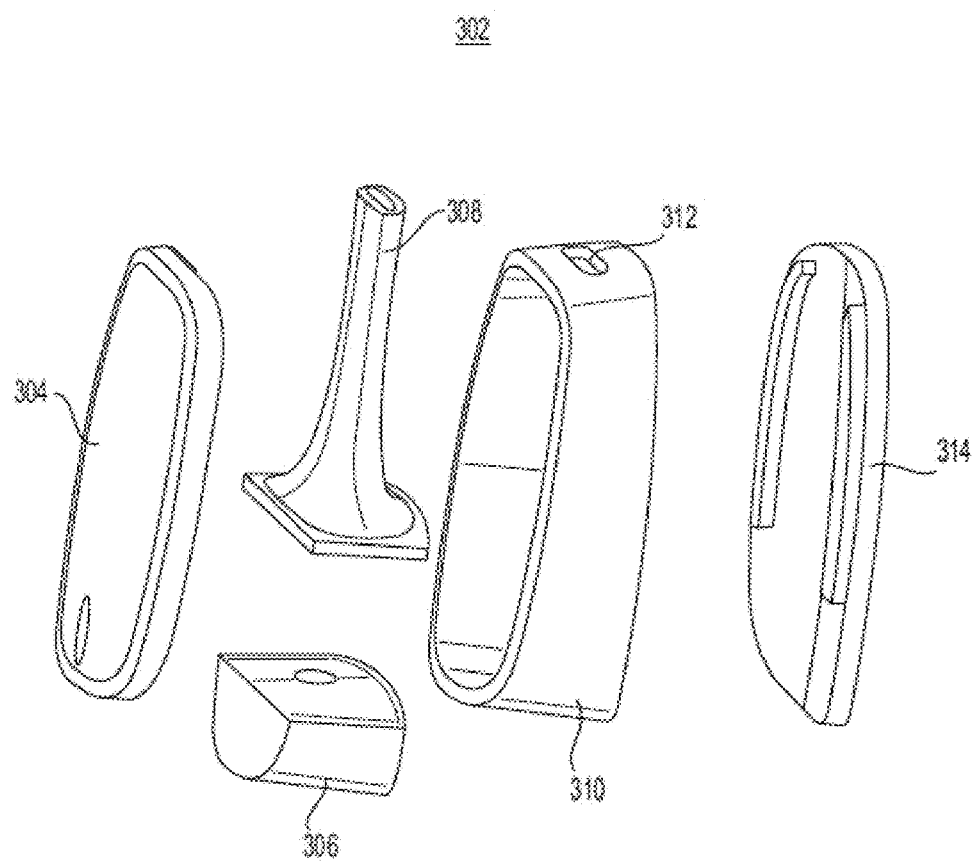
FIG. 18 is an exploded view of the pod assembly of FIG. 15.

FIG. 18 is an exploded view of the pod assembly of FIG. 15. Referring to FIG. 18, the internal space of the pod assembly 302 may be divided into a plurality of compartments by virtue of the elements therein. For instance, the tapered outlet of the vapor channel 308 may be aligned with the channel outlet 312, and the space bounded by the first cap 304, the vapor channel 308, the pod trim 310, and the second cap 314 may be regarded as the pre-vapor formulation compartment. Additionally, the bounded space under the vapor channel 308 may be regarded as the device compartment. For instance, the device compartment may include the vaporizer 306. One benefit of including the vaporizer 306 in the pod assembly 302 is that the vaporizer 306 will only be used for the amount of pre-vapor formulation contained within the pre-vapor formulation compartment and, thus, will not be overused.

Figure 19:
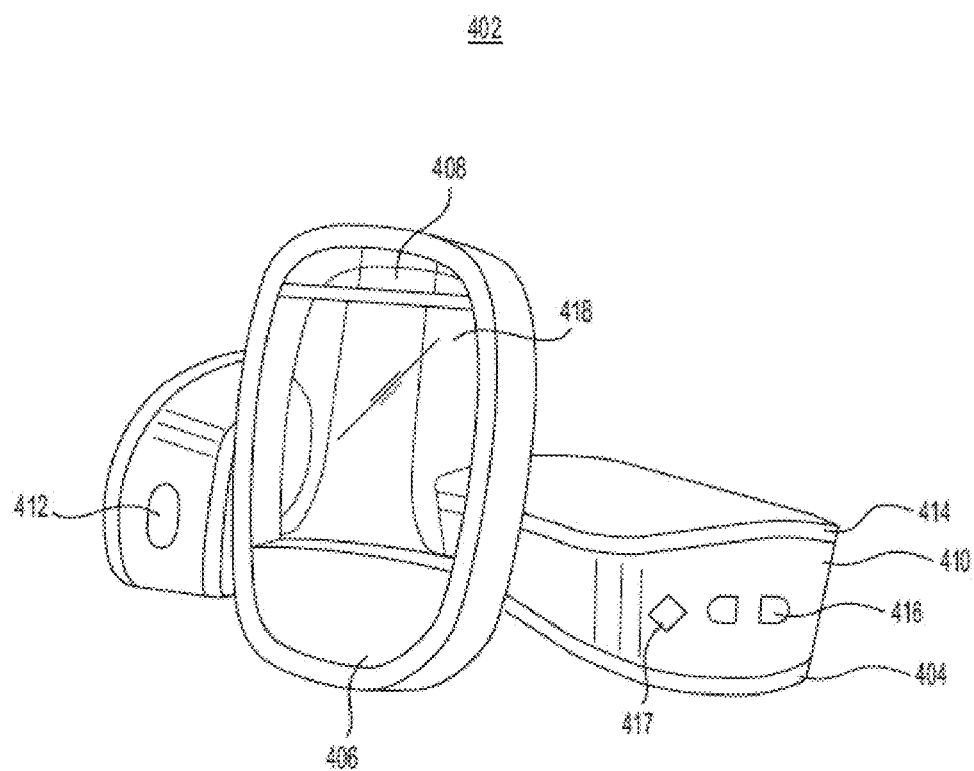
FIG. 19 a perspective view of several pod assemblies according to an example embodiment.

FIG. 19 a perspective view of several pod assemblies according to an example embodiment. Referring to FIG. 19, each of the pod assemblies 402 includes a pod trim 410 arranged between a first cap 404 and a second cap 414. The vapor channel 408 is aligned with the channel outlet 412 and arranged above the vaporizer 406. The pod assembly 402 is sealed to hold a pre-vapor formulation 418 therein and to preclude tampering therewith. The pre-vapor formulation compartment of the pod assembly 402 is configured to hold the pre-vapor formulation 418, and the device compartment includes the vaporizer 406.

In further detail, the pod assembly 402 for an e-vapor apparatus may include a pre-vapor formulation compartment configured to hold a pre-vapor formulation 418 therein. A device compartment is configured to be in fluidic communication with the pre-vapor formulation compartment. The device compartment includes a vaporizer 406. A vapor channel 408 extends from the device compartment and traverses the pre-vapor formulation compartment.

The pod assembly 402 is configured for insertion into a dispensing body. As a result, the dimensions of the pod assembly 402 may correspond to the dimensions of the through-hole (e.g., 114) of the dispensing body (e.g., 104). The vapor channel 408 may be between the mouthpiece (e.g., 108) and the device compartment when the pod assembly 402 is inserted into the through-hole of the dispensing body.

An attachment structure (e.g., male/female member arrangement, magnetic arrangement) may be provided on at least one of the side wall (e.g., 116) of the through-hole (e.g., 114) and a side surface of the pod assembly 402. The attachment structure may be configured to engage and hold the pod assembly 402 upon insertion into the through-hole of the dispensing body. In addition, the channel outlet 412 may be utilized to secure the pod assembly 402 within the through-hole of the dispensing body. For instance, the dispensing body may be provided with a retractable vapor connector that is configured to insert into the channel outlet 412 so as to secure the pod assembly 402 while also supplementing the vapor path from the channel outlet 412 to the vapor passage (e.g., 106) of the dispensing body (e.g., 104). The vapor connector may also be a rounded structure and/or spring-loaded to facilitate its retraction (e.g., via spring compression) and protraction (e.g., via spring decompression).

In an example embodiment, the pre-vapor formulation compartment of the pod assembly 402 may surround the vapor channel 408. For instance, the vapor channel 408 may pass through a center of the pre-vapor formulation compartment, although example embodiments are not limited thereto.

Alternatively, instead of the vapor channel 408 shown in FIG. 19, a vapor channel may be in a form of a pathway that is arranged along at least one sidewall of the pre-vapor formulation compartment. For example, a vapor channel may be provided in a form of a pathway that spans between the first cap 404 and the second cap 414 while extending along one or both sides of an inner surface of the pod trim 410. As a result, the pathway may have a thin, rectangular cross-section, although example embodiments are not limited thereto. When the pathway is arranged along two sidewalls of the pre-vapor formulation compartment (e.g., both inner sidewalls of the pod trim 410), the pathway along each sidewall may be configured to converge at a position (e.g., channel outlet 412) that is aligned with the vapor passage (e.g., 106) of the dispensing body (e.g., 104) when the pod assembly 402 is received in the through-hole 114.

In another instance, the vapor channel may be in a form of a conduit that is arranged in at least one corner of the pre-vapor formulation compartment. Such a corner may be at the interface of the first cap 404 and/or the second cap 414 with the inner surface of the pod trim 410. As a result, the conduit may have a triangular cross-section, although example embodiments are not limited thereto. When the conduit is arranged in at least two corners (e.g., front corners, rear corners, diagonal corners, side corners) of the pre-vapor formulation compartment, the conduit in each corner may be configured to converge at a position (e.g., channel outlet 412) that is aligned with the vapor passage (e.g., 106) of the dispensing body (e.g., 104) when the pod assembly 402 is received in the through-hole 114.

The pre-vapor formulation compartment and the device compartment may be at opposite ends of the pod assembly 402. The device compartment may include a memory device. The memory device may be coded with an electronic identity to permit at least one of an authentication of the pod assembly 402 and a pairing of operating parameters specific to a type of the pod assembly 402 when the pod assembly 402 is inserted into the through-hole of the dispensing body (e.g., smart calibration). The electronic identity may help prevent counterfeiting. The operating parameters may help optimize a vaping experience without placing a burden on the adult vaper to determine the proper settings. In an example embodiment, the level of pre-vapor formulation in the pod assembly 402 may be tracked. Additionally, the activation of the pod assembly 402 may be restricted once its intended usage life has been exceeded. Thus, the pod assembly 402 (and 302) may be regarded as a smart pod.

A side surface of the pod assembly 402 includes at least one electrical contact 416 and/or data connection 417 (e.g., two or three electrical contacts and/or data connections). The dispensing body may be configured to perform at least one of supply power to and communicate with the pod assembly 402 via the at least one electrical contact 416. The at least one electrical contact 416 may be provided at an end of the pod assembly 402 corresponding to the device compartment. Because of its smart capability, the pod assembly 402 may communicate with dispensing body and/or another electronic device (e.g., smart phone). As a result, usage patterns and other information (e.g., flavor intensity, throat feel, puff count) may be generated, stored, transferred, and/or displayed. The smart capability, connecting features, and other related aspects of the pod assembly, dispensing body, and overall e-vapor apparatus are additionally discussed in U.S. Application No. 62/151,160, U.S. Application No. 62/151, 179, and U.S. Application No. 62/151,248, the entire contents of each of which are incorporated herein by reference.

Figure 20:
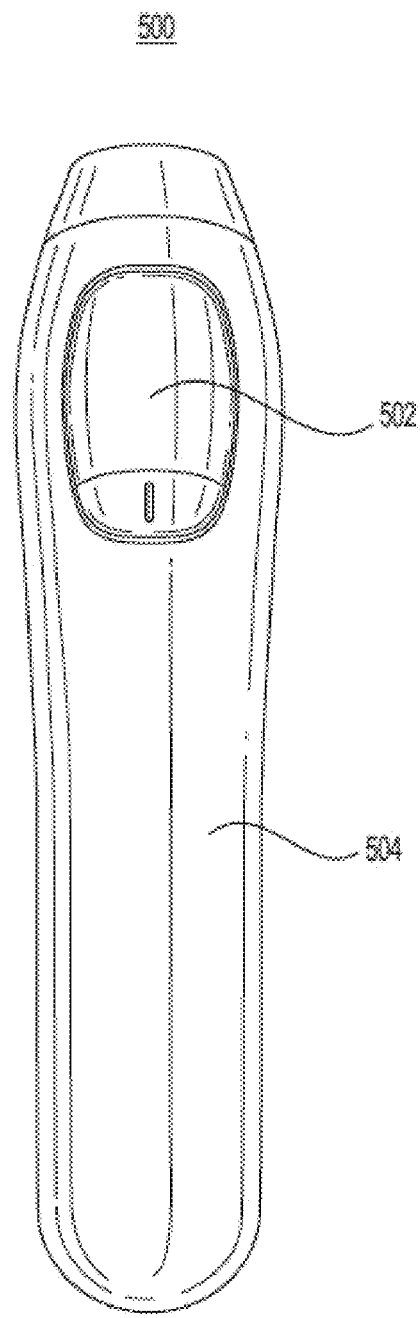
FIG. 20 is a view of an e-vapor apparatus with a pod assembly inserted in a dispensing body according to an example embodiment.

FIG. 20 is a view of an e-vapor apparatus with a pod assembly inserted in a dispensing body according to an example embodiment. Referring to FIG. 20, an e-vapor apparatus 500 includes a pod assembly 502 (e.g., smart pod) that is inserted within a dispensing body 504. The pod assembly 502 may be as previously described in connection with the pod assembly 302 and the pod assembly 402. As a result, the pod assembly 502 may be a hassle-free and leak-free part that can be replaced with relative ease when the pre-vapor formulation therein runs low/out or when another flavor is desired.

Figure 21:
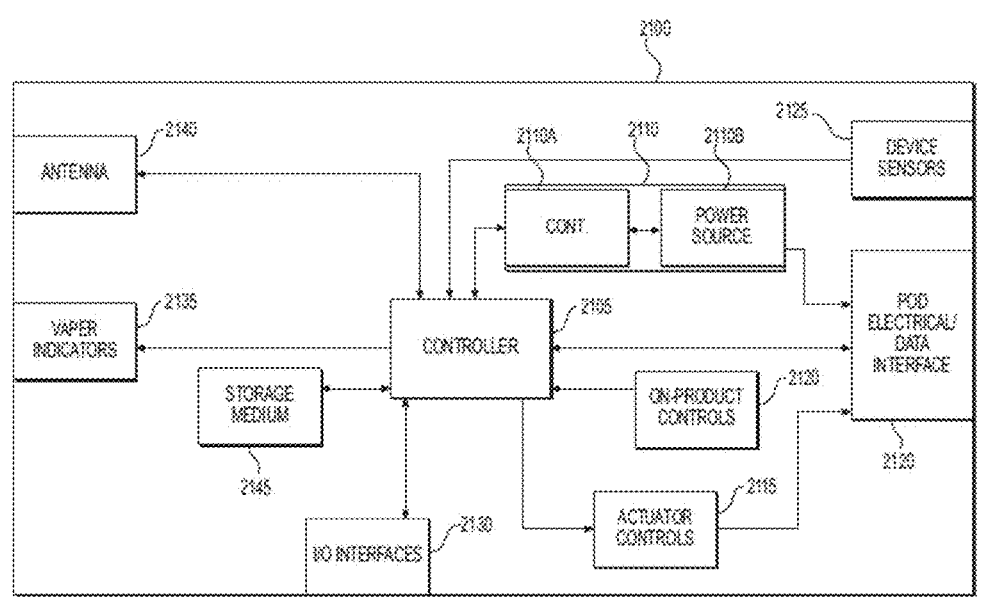
FIG. 21 illustrates a device system diagram of a dispensing body according to an example embodiment.

FIG. 21 illustrates a device system of a dispensing body according to an example embodiment. A device system 2100 may be the system within the dispensing body 104 and the dispensing body 204.

The device system 2100 includes a controller 2105, a power supply 2110, actuator controls 2115, a pod electrical/data interface 2120, device sensors 2125, input/output (I/O) interfaces 2130, vaper indicators 2135, at least one antenna 2140 and a storage medium 2145. The device system 2100 is not limited to the features shown in FIG. 21. For example, the device system 2100 may include additional elements. However, for the sake of brevity, the additional elements are not described.

The controller 2105 may be hardware, firmware, hardware executing software or any combination thereof. When the controller 2105 is hardware, such existing hardware may include one or more Central Processing Units (CPUs), digital signal processors (DSPs), application-specific-integrated-circuits (ASICs), field programmable gate arrays (FPGAs) computers or the like configured as special purpose machines to perform the functions of the processor. As stated above, CPUs, DSPs, ASICs and FPGAs may generally be referred to as processing devices.

In the event where the controller 2105 is a processor executing software, the controller 2105 is configured as a special purpose machine to execute the software, stored in the storage medium 2145, to perform the functions of the at least one of the controller 2105.

As disclosed herein, the term "storage medium", "computer readable storage medium" or "non-transitory computer readable storage medium" may represent one or more devices for storing data, including read only memory (ROM), random access memory (RAM), magnetic RAM, core memory, magnetic disk storage mediums, optical storage mediums, flash memory devices and/or other tangible machine readable mediums for storing information. The term "computer-readable medium" may include, but is not limited to, portable or fixed storage devices, optical storage devices, and various other mediums capable of storing, containing or carrying instruction(s) and/or data.

Referring to FIG. 21, the controller 2105 communicates with the power supply 2110, the actuator control 2115, the pod electrical/data interface 2120, the device sensors 2125, the input/output (I/O) interfaces 2130, the vaper indicators 2135, the at least one antenna 2140.

The controller 2105 communicates with the CC-NVM in the pod through the pod electrical/data interface 2120. More specifically, the controller 2105 may utilize encryption to authenticate the pod. As will be described, the controller 2105 communicates with the CC-NVM package to authenticate the pod. More specifically, the non-volatile memory is encoded during manufacture with product and other information for authentication.

The memory device may be coded with an electronic identity to permit at least one of an authentication of the pod and a pairing of operating parameters specific to a type of the pod when the pod assembly 402 is inserted into the through-hole of the dispensing body. In addition to authenticating based on an electronic identity of the pod, the controller 2105 may authorize use of the pod based on an expiration date of the stored pre-vapor formulation and/or heater encoded into the non-volatile memory of the CC-NVM. If the controller determines that the expiration date encoded into the non-volatile memory has passed, the controller may not authorize use of the pod and disable the e-vaping device.

The controller 2105 (or storage medium 2145) stores key material and proprietary algorithm software for the encryption. For example, encryption algorithms rely on the use of random numbers. The security of these algorithms depends on how truly random these numbers are. These numbers are usually pre-generated and coded into the processor or memory devices. Example embodiments may increase the randomness of the numbers used for the encryption by using the puffing parameters e.g. puff durations, intervals between puffs, or combinations of them, to generate numbers that are more random and more varying from individual to individual than pre-generated random numbers. All communications between the controller 2105 and the pod may be encrypted.

Moreover, the pod can be used to as a general pay-load carrier for other information such as software patches for the e-vaping device. Since encryption is used in all the communications between the pod and the controller 2105, such information is more secure and the e-vaping device is less prone to being installed with malwares or viruses. Use of the CC-NVM as an information carrier such as data and software updates allows the e-vaping device to be updated with software without it being connected to the Internet and for the adult vaper to go through a downloading process as with most other consumer electronics devices requiring periodic software updates.

The controller 2105 may also include a cryptographic accelerator to allow resources of the controller 2105 to perform functions other than the encoding and decoding involved with the authentication. The controller 2105 may also include other security features such as preventing unauthorized use of communication channels and preventing unauthorized access to data if a pod or vaper is not authenticated.

In addition to a cryptographic accelerator, the controller 2105 may include other hardware accelerators. For example, the controller 2105 may include a floating point unit (FPU), a separate DSP core, digital filters and Fast Fourier Transform (FFT) modules.

The controller 2105 operates a real time operating system (RTOS), controls the system 2100 and may be updated through communicating with the CC-NVM or when the system 2100 is connected with other devices (e.g., a smart phone) through the I/O interfaces 2130 and/or the antenna 2140. The I/O interfaces 2130 and the antenna 2140 allow the system 2100 to connect to various external devices such as smart phones, tablets, and PCs. For example, the I/O interfaces 2130 may include a micro-USB connector. The micro-USB connector may be used by the system 2100 to charge the power source 2110b.

The controller 2105 may include on-board RAM and flash memory to store and execute code including analytics, diagnostics and software upgrades. As an alternative, the storage medium 2145 may store the code. Additionally, in another example embodiment, the storage medium 2145 may be on-board the controller 2105.

The controller 2105 may further include on-board clock, reset and power management modules to reduce an area covered by a PCB in the dispensing body.

The device sensors 2125 may include a number of sensor transducers that provide measurement information to the controller 2105. The device sensors 2125 may include a power supply temperature sensor, an external pod temperature sensor, a current sensor for the heater, power supply current sensor, air flow sensor and an accelerometer to monitor movement and orientation. The power supply temperature sensor and external pod temperature sensor may be a thermistor or thermocouple and the current sensor for the heater and power supply current sensor may be a resistive based sensor or another type of sensor configured to measure current. The air flow sensor may be a microelectromechanical system (MEMS) flow sensor or another type of sensor configured to measure air flow.

The data generated from the number of sensor transducers may be sampled at a sample rate appropriate to the parameter being measured using a discrete, multi-channel analog-to-digital converter (ADC).

The controller 2105 may adapt heater profiles for a pre-vapor formulation and other profiles based on the measurement information received from the controller 2105. For the sake of convenience, these are generally referred to as vaping or vapor profiles.

The heater profile identifies the power profile to be supplied to the heater during the few seconds when a negative pressure is applied to the e-vapor device. An example of a heater profile may be the delivery of maximum power to the heater when a negative pressure is initially applied, but then after a second or so immediately reduce the power to half-way or a quarter-way or so.

The modulation of electrical power is usually implemented using pulse wave modulation instead of flipping an on/off switch such that the power is either full on or off.

In addition, a heater profile can also be modified by the extent to which the adult vaper applies negative pressure to the e-vaping device. The use of the MEMS flow sensor allows puff strength to be measured and used as feedback to the controller 2105 to adjust the power delivered to the heater of the pod, which may be referred to as heating or energy delivery.

When the controller 2105 recognizes the pod currently installed (e.g., via SKU), the controller 2105 matches an associated heating profile that is designed for that particular pod. The controller 2105 and the storage medium 2145 will store data and algorithms that allow the generation of heating profiles for all SKUs. The adult vapers may also adjust heating profiles to suit their preferences.

As shown in FIG. 21, the controller 2105 sends data to and receives data from the power supply 2110. The power supply 2110 includes a power source 2110*b* and a power controller 2110*a* to manage the power output by the power source 2110*b*.

The power source 2110*b* may be a Lithium-ion battery or one of its variants, for example a Lithium-ion polymer battery. Alternatively, the power source power source 2110*b* may be a Nickel-metal hydride battery, a Nickel cadmium battery, a Lithium-manganese battery, a Lithium-cobalt battery or a fuel cell. Alternatively, the power source 2110*b* may be rechargeable and include circuitry allowing the battery to be chargeable by an external charging device. In that case, the circuitry, when charged, provides power for a desired (or alternatively a pre-determined) number of puffs, after which the circuitry must be re-connected to an external charging device.

The power controller 2110*a* provides commands to the power source 2110*b* based on instructions from the controller 2105. For example, the power supply 2110 may receive a command from the controller 2105 to provide power to the pod (through the electrical/data interface 2120) when the pod is authenticated and the adult vaper activates the system 2100 (e.g., by activating a switch such as a toggle button, capacitive sensor, IR sensor). When the pod is not authenticated, the controller 2105 may either send no command to the power supply 2110 or send an instruction to the power supply 2110 to not provide power. In another example embodiment, the controller 2105 may disable all operations of the system 2100 if the pod is not authenticated.

In addition to supplying power to the pod, the power supply 2110 also supplies power to the controller 2105. Moreover, the power controller 2110*a* may provide feedback to the controller 2105 indicating performance of the power source 2110*b*.

The controller 2105 sends data to and receives data from the at least one antenna 2140. The at least one antenna 2140 may include a Near Field Communication (NFC) modem and a Bluetooth Low Energy (LE) modem and/or other modems for other wireless technologies (e.g., Wi-Fi). In an example embodiment, the communications stacks are in the modems, but the modems are controlled by the controller 2105. The Bluetooth LE modem is used for data and control communications with an application on an external device (e.g., smart phone). The NFC modem may be used for pairing of the e-vaping device to the application and retrieval of diagnostic information. Moreover, the NFC modem may be used to provide location information (for an adult vaper to find the e-vaping device) or authentication during a purchase.

As described above, the system 2100 may generate and adjust various profiles for vaping. The controller 2105 uses the power supply 2110 and the actuator controls 2115 to regulate the profile for the adult vaper.

The actuator controls 2115 include passive and active actuators to regulate a desired vapor profile. For example, the dispensing body may include an inlet channel within a mouthpiece. The actuator controls 2115 may control the inlet channel based on commands from the controller 2105 associated with the desired vapor profile.

Moreover, the actuator controls 2115 are used to energize the heater in conjunction with the power supply 2110. More specifically, the actuator controls 2115 are configured to generate a drive waveform associated with the desired vaping profile. As described above, each possible profile is associated with a drive waveform. Upon receiving a command from the controller 2105 indicating the desired vaping profile, the actuator controls 2115 may produce the associated modulating waveform for the power supply 2110.

The controller 2105 supplies information to the vaper indicators 2135 to indicate statuses and occurring operations to the adult vaper. The vaper indicators 2135 include a power indicator (e.g., LED) that may be activated when the controller 2105 senses a button press by the adult vaper. The vaper indicators 2135 may also include a vibrator, speaker, an indicator for current state of a vaper-controlled vaping parameter (e.g., vapor volume) and other feedback mechanisms.

Furthermore, the system 2100 may include a number of on-product controls 2150 that provide commands from an adult vaper to the controller 2105. The on-product controls 2150 include an on-off button which may be a toggle button, capacitive sensor or IR sensor, for example. The on-product controls 2150 may further include a vaping control button (if the adult vaper desires to override the buttonless vaping feature to energize the heater), a hard reset button, a touch based slider control (for controlling setting of a vaping parameter such as puff volume), a vaping control button to activate the slider control and a mechanical adjustment for an air inlet.

Once a pod is authenticated, the controller 2105 operates the power supply 2110, the actuator controls 2115, vaper indicators 2135 and antenna 2140 in accordance with an adult vaper using the e-vaping device and the information stored by the CC-NVM on the pod. Moreover, the controller 2105 may include logging functions and be able to implement algorithms to calibrate the e-vaping device. The logging functions are executed by the controller 2105 to record usage data as well any unexpected events or faults. The recorded usage data may be used for diagnostics and analytics. The controller 2105 may calibrate the e-vaping device using buttonless vaping, a vaper configuration and the stored information on the CC-NVM including puff sensing, pre-vapor formulation level, and pre-vapor formulation composition. For example, the controller 2105 may command the power supply 2110 to supply power to the heater in the pod based on a vaping profile associated with the pre-vapor formulation composition in the pod. Alternatively, a vaping profile may be encoded in the CC-NVM and utilized by the controller 2105.

Figure 22:
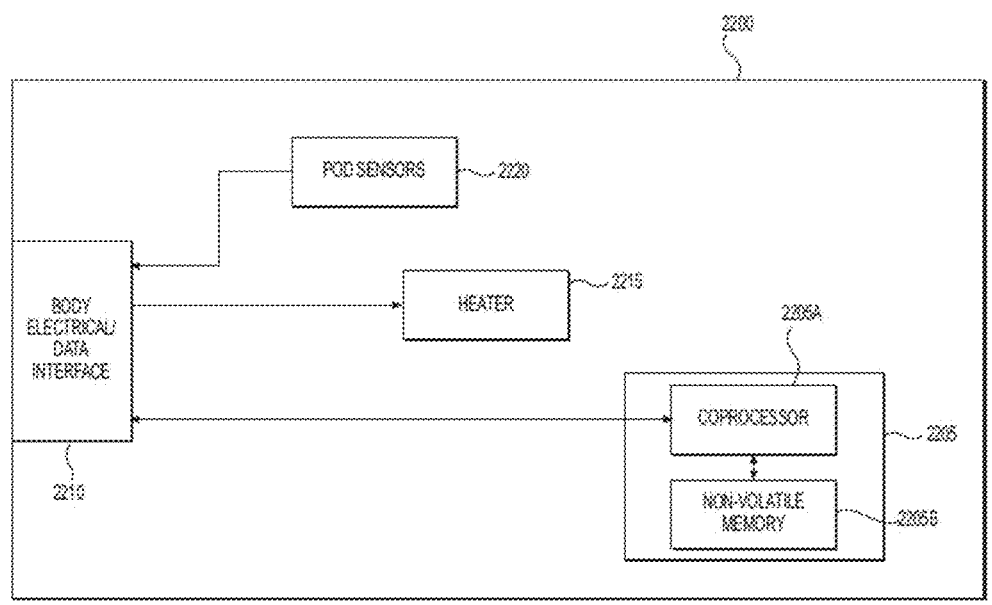
FIG. 22 illustrates a pod system diagram of a dispensing body according to an example embodiment.

FIG. 22 illustrates a pod system diagram of a dispensing body according to an example embodiment. A pod system 2200 may be within the pod assembly 502, the pod assembly 302 and the pod assembly 402.

As shown in FIG. 22, the pod system 2200 includes a CC-NVM 2205, a body electrical/date interface 2210, a heater 2215 and pod sensors 2220. The pod system 2200 communicates with the device system 2100 through the body electrical/data interface 2210 and the pod electrical/data interface 2120. The body electrical/data interface 2210 may correspond to the electrical contacts 416 and data connection 417 connected within the pod 402, shown in FIG. 19, for example. Thus, the CC-NVM 2205 is coupled to the data connection 417 and the electrical contacts 416.

The CC-NVM 2205 includes a cryptographic coprocessor 2205a and a non-volatile memory 2205b. The controller 2105 may access the information stored on the non-volatile memory 2205b for the purposes of authentication and operating the pod by communicating with the cryptographic coprocessor 2205a.

The non-volatile memory 2205b may be coded with an electronic identity to permit at least one of an authentication of the pod and a pairing of operating parameters specific to a type of the pod when the pod assembly is inserted into the through-hole of the dispensing body. In addition to authenticating based on an electronic identity of the pod, the controller 2105 may authorize use of the pod based on an expiration date of the stored pre-vapor formulation and/or heater encoded into the non-volatile memory 2205b of the CC-NVM. If the controller determines that the expiration date encoded into the non-volatile memory non-volatile memory 2205b has passed, the controller may not authorize use of the pod and disable the e-vaping device.

Moreover, the non-volatile memory 2205b may store information such as a stock keeping unit (SKU) of the pre-vapor formulation in the pre-vapor formulation compartment (including pre-vapor formulation composition), software patches for the system 2100, product usage information such as puff count, puff duration, and pre-vapor formulation level. The non-volatile memory 2205b may store operating parameters specific to the type of the pod and the pre-vapor formulation composition. For example, the non-volatile memory 2205b may store the electrical and mechanical design of the pod for use by the controller 2105 to determine commands corresponding to a desired vaping profile.

The pre-vapor formulation level in the pod may be determined in one of two ways, for example. In one example embodiment, one of the pod sensors 2220 directly measures the pre-vapor formulation level in the pod.

In another example embodiment, the non-volatile memory 2205b stores the number of puffs taken from the pod and the controller 2105 uses the number of puffs taken as a proxy to the amount of pre-vapor formulation that is vaporized.

The controller 2105 and/or the storage medium 2145 may store pre-vapor formulation calibration data that identifies an operating point for the pre-vapor formulation composition. The pre-vapor formulation calibration data include data describing how flow rate changes with a remaining pre-vapor formulation level or how volatility changes with an age of the pre-vapor formulation and may be used for calibration by the controller 2105. The pre-vapor formulation calibration data may be stored by the controller 2105 and/or the storage medium 2145 in a table format. The pre-vapor formulation calibration data allows the controller 2105 to equate the number of puffs taken to the amount of pre-vapor formulation that is vaporized.

The controller 2105 writes the pre-vapor formulation level and number of puffs taken back to the non-volatile memory 2205b in the pod so if the pod is removed from the dispensing body and later on re-installed, an accurate pre-vapor formulation level of the pod will still be known by the controller 2105.

The operating parameters (e.g., power supply, power duration, air channel control) are referred to as a vaping profile. Moreover, the non-volatile memory 2205b may record information communicated by the controller 2105. The non-volatile memory 2205b may retain the recorded information even when the dispensing body becomes disconnected from the pod.

In an example embodiment, the non-volatile memory 2205b may be a programmable read only memory.

The heater 2215 is actuated by the controller 2105 and transfers heat to the pre-vapor formulation in accordance with the commanded profile (volume, temperature (based on power profile) and flavor) from the controller 2105.

The heater 2215 may be a wire coil surrounding a wick, a mesh, a surface or made out of a ceramic material for example. Examples of suitable electrically resistive materials include titanium, zirconium, tantalum and metals from the platinum group. Examples of suitable metal alloys include stainless steel, nickel-, cobalt-, chromium-, aluminum-titanium-zirconium-, hafnium-, niobium-, molybdenum-, tantalum-, tungsten-, tin-, gallium-, manganese- and iron-containing alloys, and super-alloys based on nickel, iron, cobalt, stainless steel. For example, the heater may be formed of nickel aluminides, a material with a layer of alumina on the surface, iron aluminides and other composite materials, the electrically resistive material may optionally be embedded in, encapsulated or coated with an insulating material or vice-versa, depending on the kinetics of energy transfer and the external physicochemical properties required. In one embodiment, the heater 14 comprises at least one material selected from the group consisting of stainless steel, copper, copper alloys, nickel-chromium alloys, superalloys and combinations thereof. In an embodiment, the heater 2215 is formed of nickel-chromium alloys or iron-chromium alloys. In one embodiment, the heater 2215 can be a ceramic heater having an electrically resistive layer on an outside surface thereof.

In another embodiment, the heater 2215 may be constructed of an iron-aluminide (e.g., FeAl or Fe$_3$Al), such as those described in commonly owned U.S. Pat. No. 5,595,706 to Sikka, et al., filed Dec. 29, 1994, or nickel aluminides (e.g., Ni$_3$Al), the entire contents of which are hereby incorporate by reference.

The heater 2215 may determine an amount of pre-vapor formulation to heat based on feedback from the pod sensors or the controller 2105. The flow of pre-vapor formulation may be regulated by a micro-capillary or wicking action. Moreover, the controller 2105 may send commands to the heater 2215 to adjust an air inlet to the heater 2215.

The pod sensor 2220 may include a heater temperature sensor, pre-vapor formulation flow rate monitor and air flow monitor. The heater temperature sensor may be a thermistor or thermocouple and the flow rate sensing may be performed by the system 2200 using electrostatic interference or an in-liquid rotator. The air flow sensor may be a microelectromechanical system (MEMS) flow sensor or another type of sensor configured to measure air flow.

The data generated from the pod sensors 2220 may be sampled at a sample rate appropriate to the parameter being measured using a discrete, multi-channel analog-to-digital converter (ADC).

Figure 23:
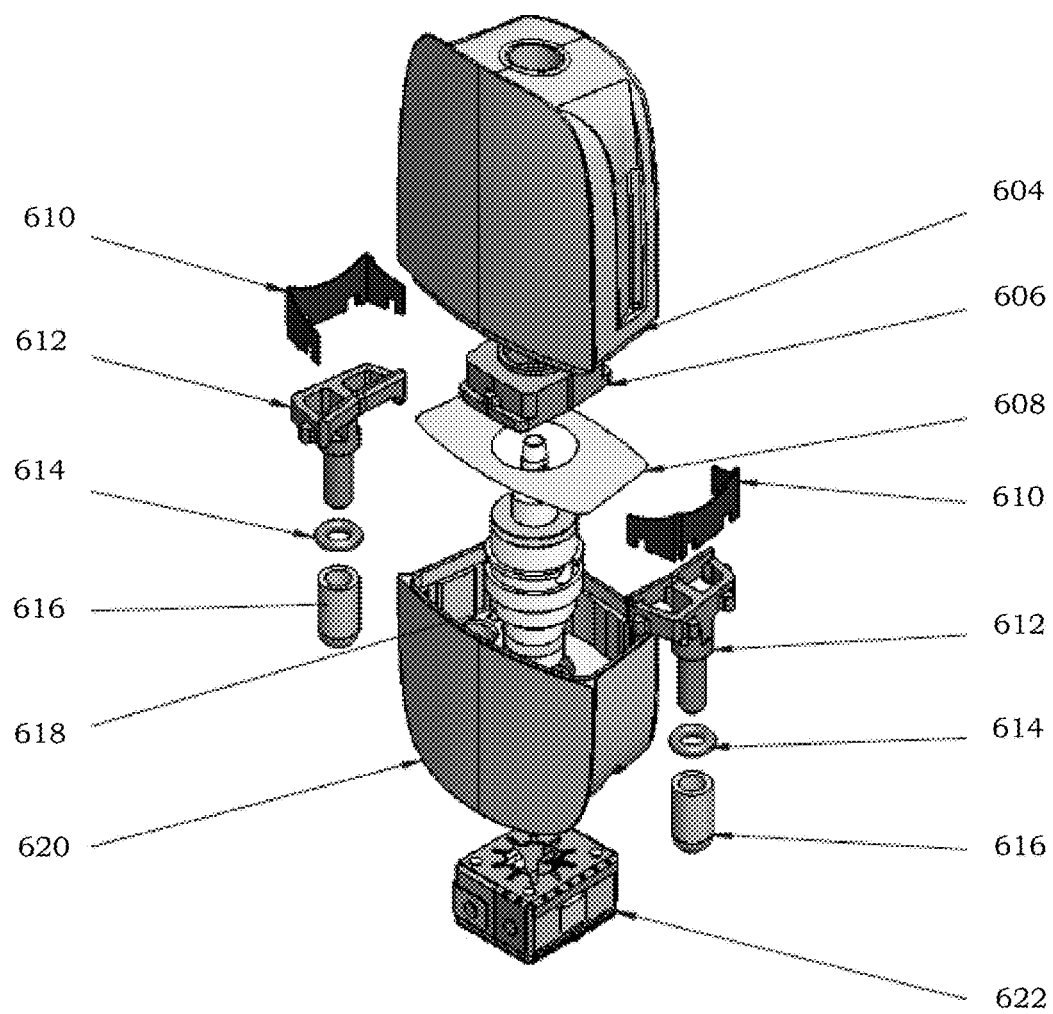
FIG. 23 is an exploded view of another pod assembly of an e-vapor apparatus according to an example embodiment.

FIG. 23 is an exploded view of another pod assembly of an e-vapor apparatus according to an example embodiment. Referring to FIG. 23, a pin piercing mechanism is employed to actuate the pod assembly 602 prior to use. In an example embodiment, the pod assembly 602 includes an upper pod case 604, a seal 606, a foil 608, a blade 610, a pin 612, an O-ring 614, a cap 616, a vaporizer 618, a lower pod case 620, and an electrical contact unit 622.

The pod assembly 602 is configured to store a pre-vapor formulation within an internal, hermetically-sealed compartment so as to isolate the pre-vapor formulation from other internal elements until the pod assembly 602 is actuated for vaping. Because the pre-vapor formulation is isolated from the environment as well as the internal elements of the pod assembly 602 that may potentially react with the pre-vapor formulation, the possibility of adverse effects to the shelf-life and/or sensorial characteristics (e.g., flavor) of the pre-vapor formulation may be reduced or prevented. The internal, hermetically-sealed compartment within the pod assembly 602 may be a reservoir defined by the upper pod case 604, the seal 606, and the foil 608.

The blade 610 is configured to be mounted or attached to an upper portion of the pin 612. The mounting or attachment may be achieved via a snap-fit connection, a friction fit connection, an adhesive, or other suitable coupling technique. The top of the blade 610 may have one or more curved or concave edges that taper upward to a pointed tip. As shown in FIG. 23, two blades 610 and two corresponding pins 612 may be provided on opposite sides of the vaporizer 618, although example embodiments are not limited thereto. Each of the blades 610 may have two pointed tips with a concave edge therebetween and a curved edge adjacent to each pointed tip. The radii of curvature of the concave edge and the curved edges may be the same, while their arc lengths may differ. The blade 610 may be formed of a sheet metal (e.g., stainless steel) that is cut or otherwise shaped to have the desired profile and bent to its final form. In another instance, the blade 610 may be formed of plastic if the foil 608 is relatively thin.

The lower portion of the pin 612 is configured to extend through a bottom section of the lower pod case 620. The distal end of the lower portion of the pin 612 is also provided with the O-ring 614 and covered with the cap 616. The O-ring 614 may be formed of silicone. The electrical contact unit 622 is configured to provide an electrical connection between the pod assembly 602 and a power supply (e.g., battery) so as to power the vaporizer 618 when the pod assembly 602 is inserted in a dispensing body for vaping.

Figure 24A:
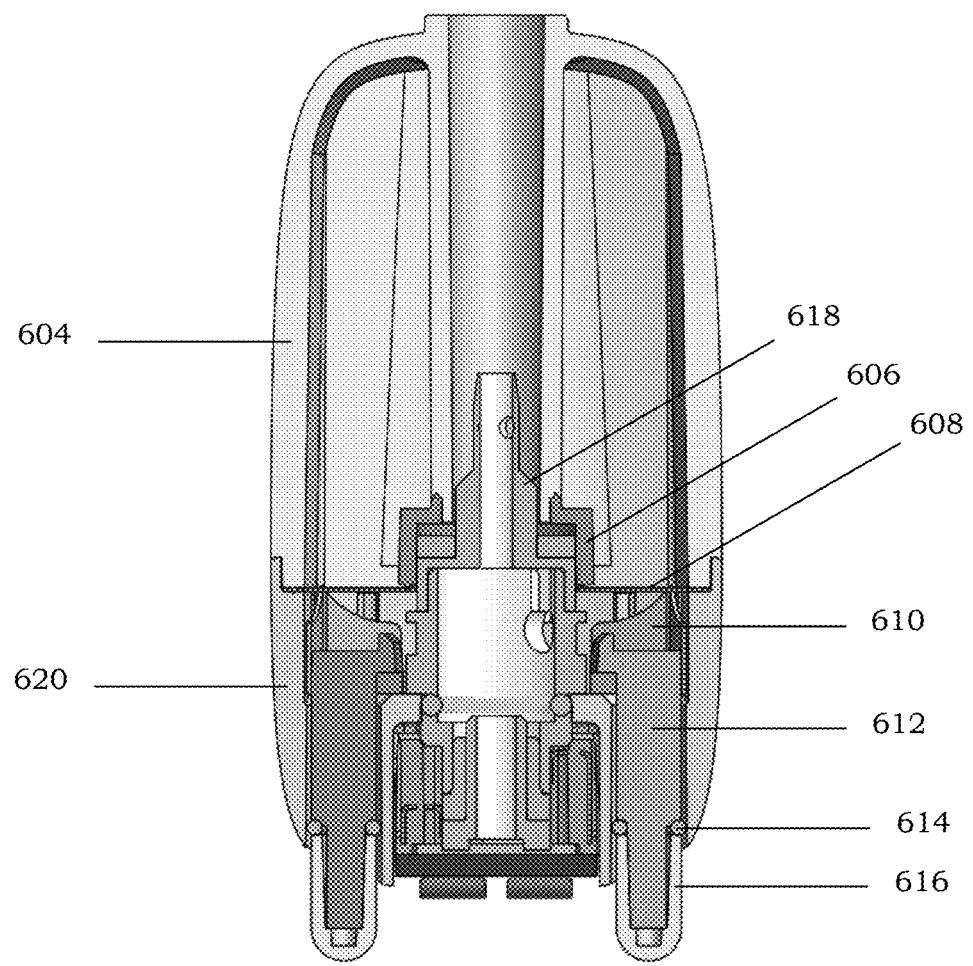
FIG. 24A is a cross-sectional view of the pod assembly of FIG. 23 when assembled and before actuation.
Figure 24B:
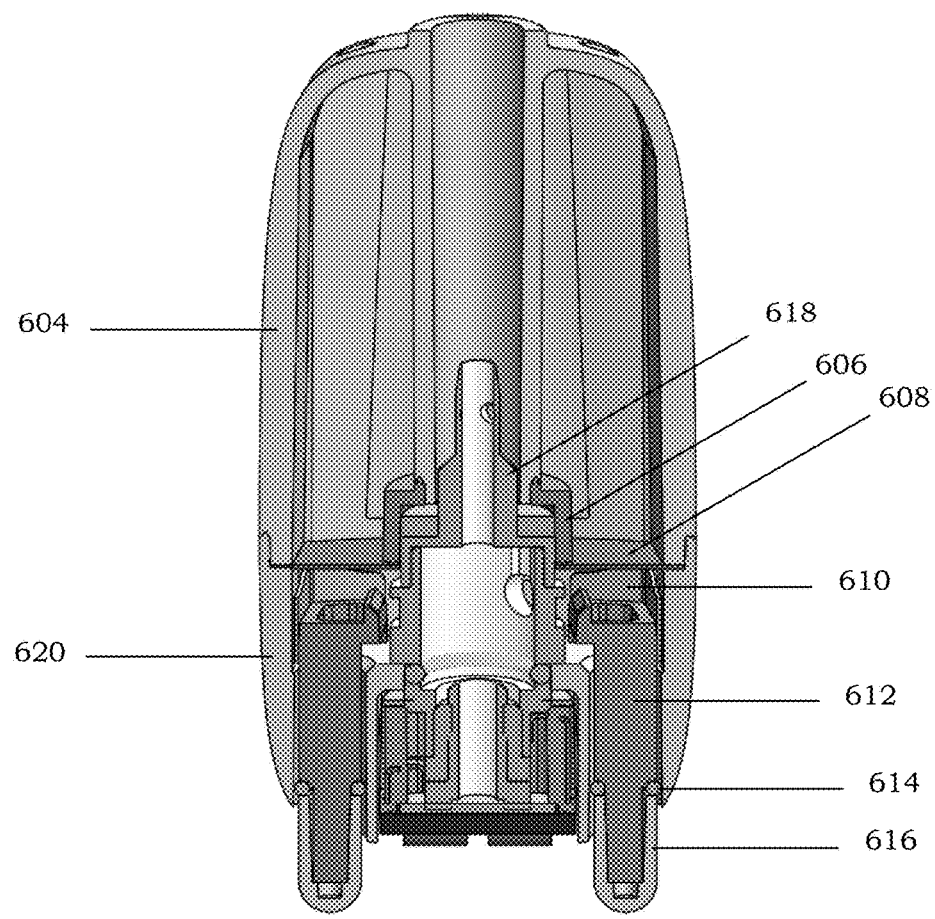
FIG. 24B is a tilted cross-sectional view of the pod assembly of FIG. 23 when assembled and before actuation.

FIG. 24A is a cross-sectional view of the pod assembly of FIG. 23 when assembled and before actuation. FIG. 24B is a tilted cross-sectional view of the pod assembly of FIG. 23 when assembled and before actuation. Referring to FIG. 24A and FIG. 24B, the upper pod case 604 is configured to engage with the lower pod case 620. The engagement may be via a snap-fit connection, a friction fit connection, an adhesive, or other suitable coupling technique. The upper portion of the vaporizer 618 is configured to extend into a vapor channel within the upper pod case 604, while the lower portion of the vaporizer 618 is configured to engage with the electrical contact unit 622. The sector of the pod assembly 602 above the foil 608 for containing the pre-vapor formulation may be regarded as the pre-vapor formulation compartment, while the sector of the pod assembly 602 below the foil 608 may be regarded as the device compartment. The device compartment may be further regarded as being divided into at least a heating section and an electronics section. In an example embodiment, the vaporizer 618 is regarded as being part of the heating section.

Before the actuation of the pod assembly 602, the blade 610 and the pin 612 will be below the foil 608 and, thus, below the reservoir containing the pre-vapor formulation. As a result, the distal end of the lower portion of the pin 612 (which is covered by the cap 616) will protrude from the bottom section of the lower pod case 620. The foil 608 is designed to be strong enough to remain intact during the normal movement and/or handling of the pod assembly 602 so as to avoid being prematurely/inadvertently breached. For instance, the foil 608 may be a coated foil (e.g., aluminum-backed Tritan).

Figure 25A:
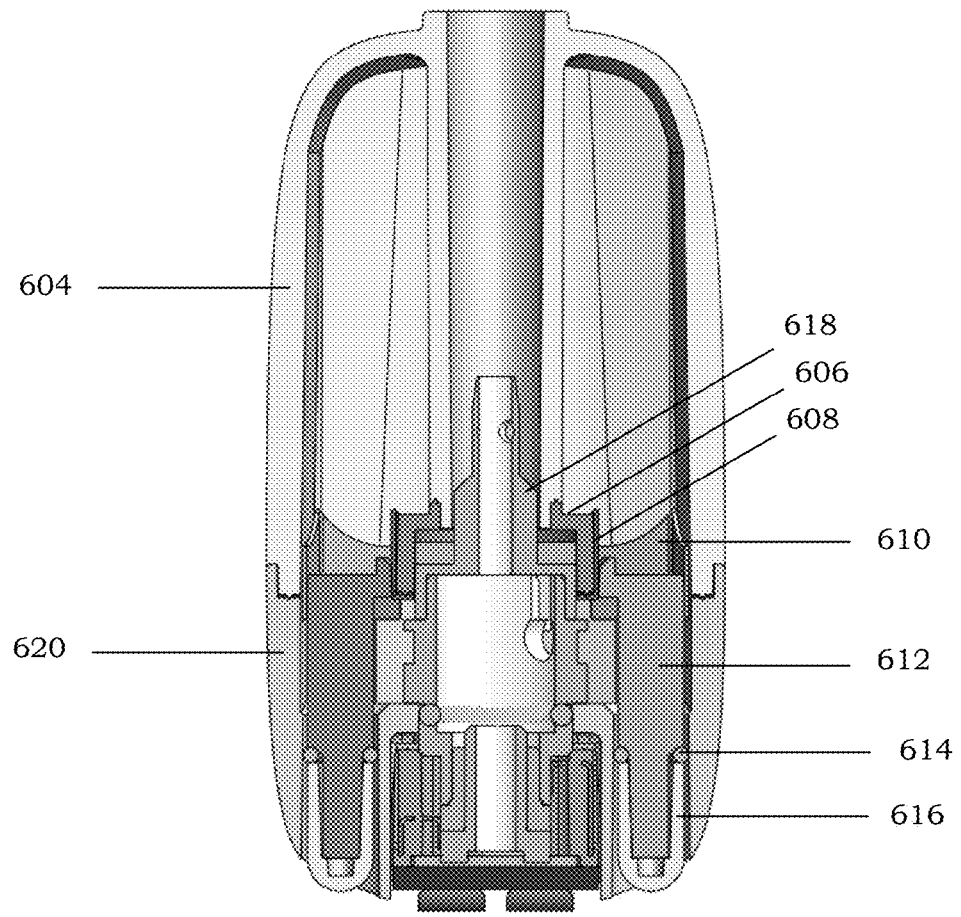
FIG. 25A is a cross-sectional view of the pod assembly of FIG. 23 when assembled and after actuation.
Figure 25B:
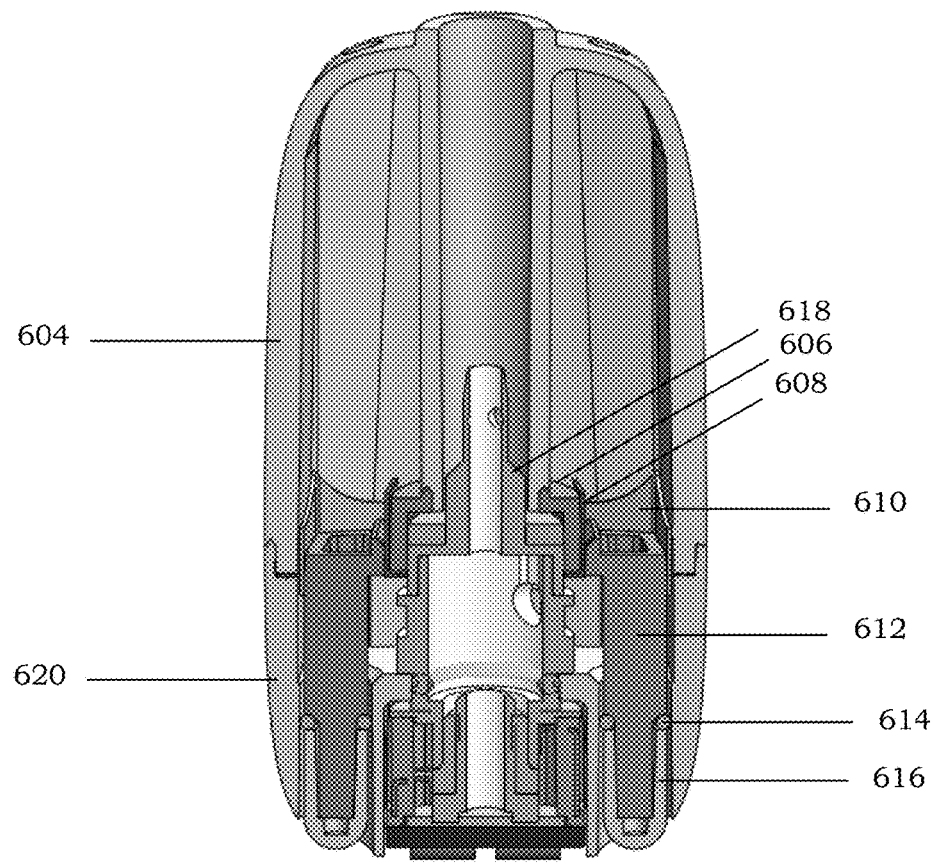
FIG. 25B is a tilted cross-sectional view of the pod assembly of FIG. 23 when assembled and after actuation.
Figure 25C:
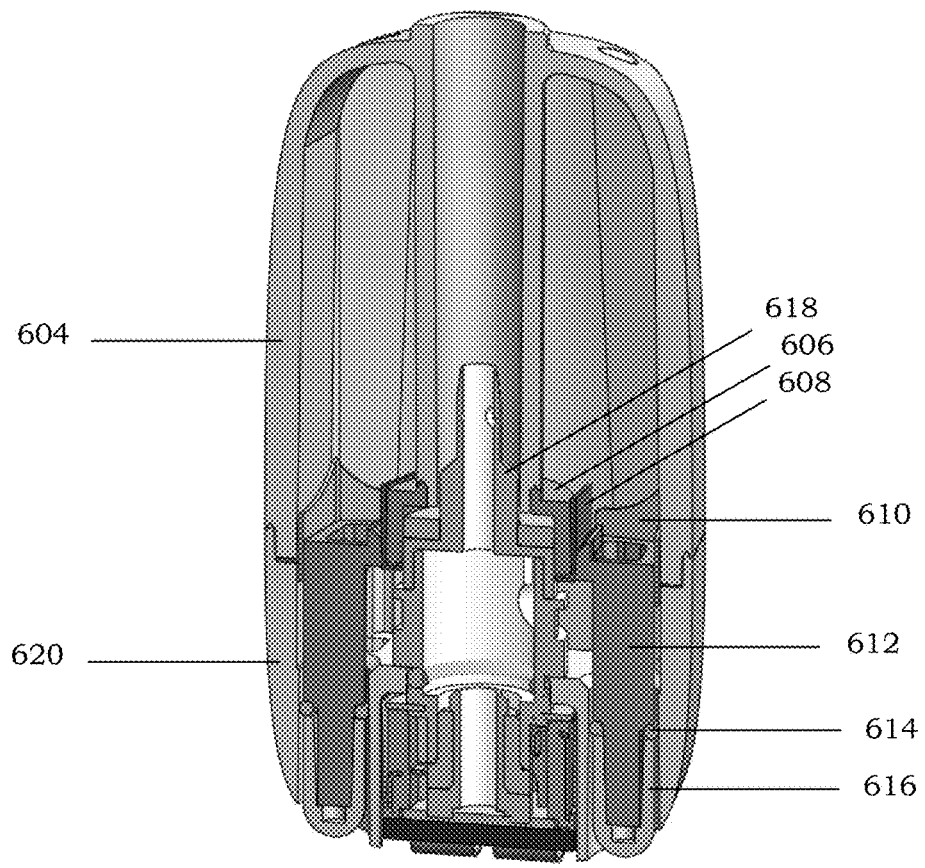
FIG. 25C is a tilted and angled cross-sectional view of the pod assembly of FIG. 23 when assembled and after actuation.

FIG. 25A is a cross-sectional view of the pod assembly of FIG. 23 when assembled and after actuation. FIG. 25B is a tilted cross-sectional view of the pod assembly of FIG. 23 when assembled and after actuation. FIG. 25C is a tilted and angled cross-sectional view of the pod assembly of FIG. 23 when assembled and after actuation. Referring to FIG. 25A, FIG. 25B, and FIG. 25C, the pin 612 is pushed inward to actuate the pod assembly 602. The pin 612 may be pushed inward manually by an adult vaper prior to inserting the actuated pod assembly 602 into the dispensing body. In such an instance, the pod assembly 602 may be configured to produce an audible sound (e.g., click) to indicate to the adult vaper that the pin 612 has been pushed sufficiently inward for actuation. The pod assembly 602 may also be configured such that the pin 612 is locked in place so as to not slide outward after actuation. Alternatively, the pin 612 may be pushed inward concurrently with the insertion of the pod assembly 602 by engaging features on the dispensing body. In another non-limiting embodiment, the unactuated pod assembly 602 may be first inserted into the dispensing body and then the pin 612 may be subsequently pushed inward mechanically by the dispensing body to actuate the pod assembly 602. The action to push the pin 612 may be performed automatically by the dispensing body or initiated by a button pressed by an adult vaper. Furthermore, the pod assembly 602 may be configured such that the pin 612 does not protrude from the bottom section of the lower pod case 620 when in the unactuated state.

During the actuation of the pod assembly 602, the inward movement of the pin 612 will cause the blade 610 to pierce and cut the foil 608 so as to release the pre-vapor formulation from the reservoir. In an example embodiment, the pin 612 includes an inner lip that folds the foil 608 back after (or concurrently with) the piercing and cutting by the blade 610. In such an instance, the foil 608 may be pushed against the seal 606 by the inner lip of the pin 612. The pin 612 may also include a groove or channel extending from its upper portion (which is adjacent to the blade 610) and extending downward along a part of its length. The pod assembly 602 may be configured such that the lower terminus of the groove or channel will be aligned with an opening in the vaporizer 618 when the pin 612 is pushed inward during actuation. The groove or channel in the pin 612 may facilitate the flow of the pre-vapor formulation into the opening of the vaporizer 618. The vaporizer 618 includes a heater that will be in thermal and/or fluidic communication with the pre-vapor formulation after the pod assembly 602 is actuated. The heater within the vaporizer 618 is not particularly limited and may include a number of suitable types and configurations. During vaping, the vaporizer 618 will be activated to heat the pre-vapor formulation to generate a vapor that will be drawn through the vapor channel of the upper pod case 604 when a negative pressure is applied to the mouthpiece of the e-vapor device.

Figure 26:
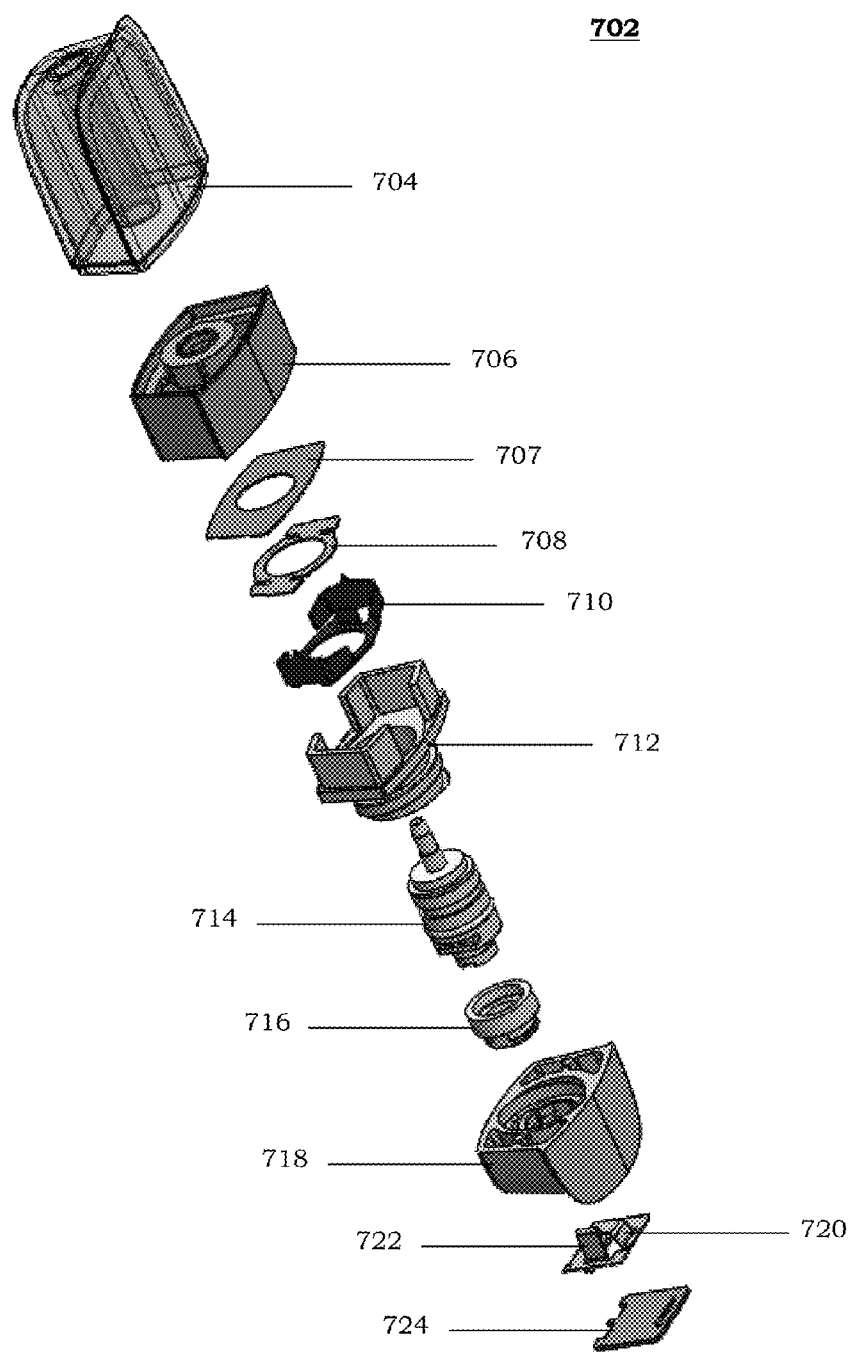
FIG. 26 is an exploded view of another pod assembly of an e-vapor apparatus according to an example embodiment.

FIG. 26 is an exploded view of another pod assembly of an e-vapor apparatus according to an example embodiment. Referring to FIG. 26, a twist piercing mechanism is employed to actuate the pod assembly 702 prior to use. In an example embodiment, the pod assembly 702 includes an upper pod case 704, a cap 706, a foil 707, a foil folder 708, a blade 710, a screw 712, a vaporizer 714, an insert 716, a lower pod case 718, a first contact 720, a second contact 722, and a printed circuit board (PCB) 724.

The pod assembly 702 is configured to store a pre-vapor formulation within an internal, hermetically-sealed compartment so as to isolate the pre-vapor formulation from other internal elements until the pod assembly 702 is actuated for vaping. Because the pre-vapor formulation is isolated from the environment as well as the internal elements of the pod assembly 702 that may potentially react with the pre-vapor formulation, the possibility of adverse effects to the shelf-life and/or sensorial characteristics (e.g., flavor) of the pre-vapor formulation may be reduced or prevented. The internal, hermetically-sealed compartment within the pod assembly 702 may be a reservoir defined by the upper pod case 704, the cap 706, and the foil 707. The foil folder 708 may be formed of stainless steel. In an example embodiment, the pod assembly 702 may be configured such that the foil 707 is integrated with the cap 706 for sealing the reservoir. Alternatively, the foil 707 may be included in the pod assembly 702 as a structure that is separate from the cap 706.

The blade 710 may be configured to sit within the upper portion of the screw 712. The size and shape of the blade 710 may be such that a lateral or rotational motion within the upper portion of the screw 712 is restricted or precluded while an axial displacement is permitted. In FIG. 26, the blade 710 is shown as having two pointed tips on opposite sides of a central opening. However, it should be understood that example embodiments are not limited thereto. The blade 710 may be formed of stainless steel. Alternatively, the blade 710 may be formed of plastic if the foil 707 is relatively thin.

The upper portion of the vaporizer 714 is configured to extend through the central openings of the screw 712, the blade 710, the foil folder 708, and the cap 706 and into a vapor channel within the upper pod case 704. The insert 716 is configured to receive the lower portion of the vaporizer 714, and both the insert 716 and the lower portion of the vaporizer 714 are seated in the lower pod case 718. The insert 716 may be formed of brass. The lower portion of the screw 712 is configured to be threadedly engaged with the lower pod case 718. The first contact 720 and the second contact 722 may be formed of beryllium copper (BeCu).

Figure 27A:
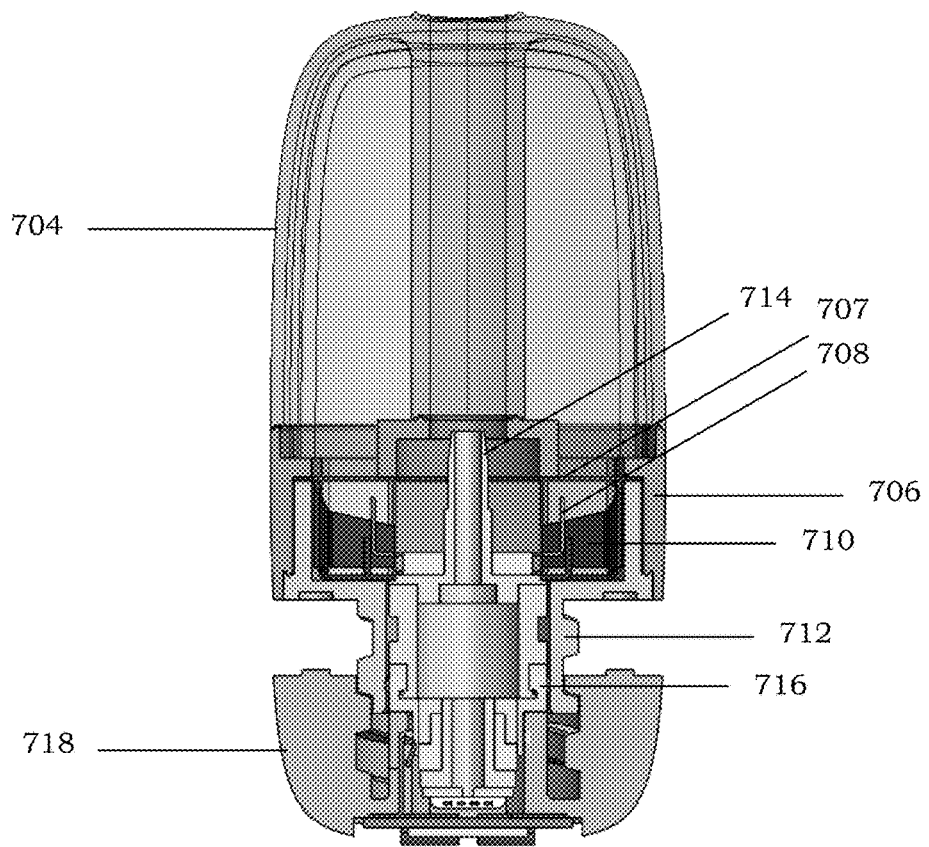
FIG. 27A is a cross-sectional view of the pod assembly of FIG. 26 when assembled and before actuation.
Figure 27B:
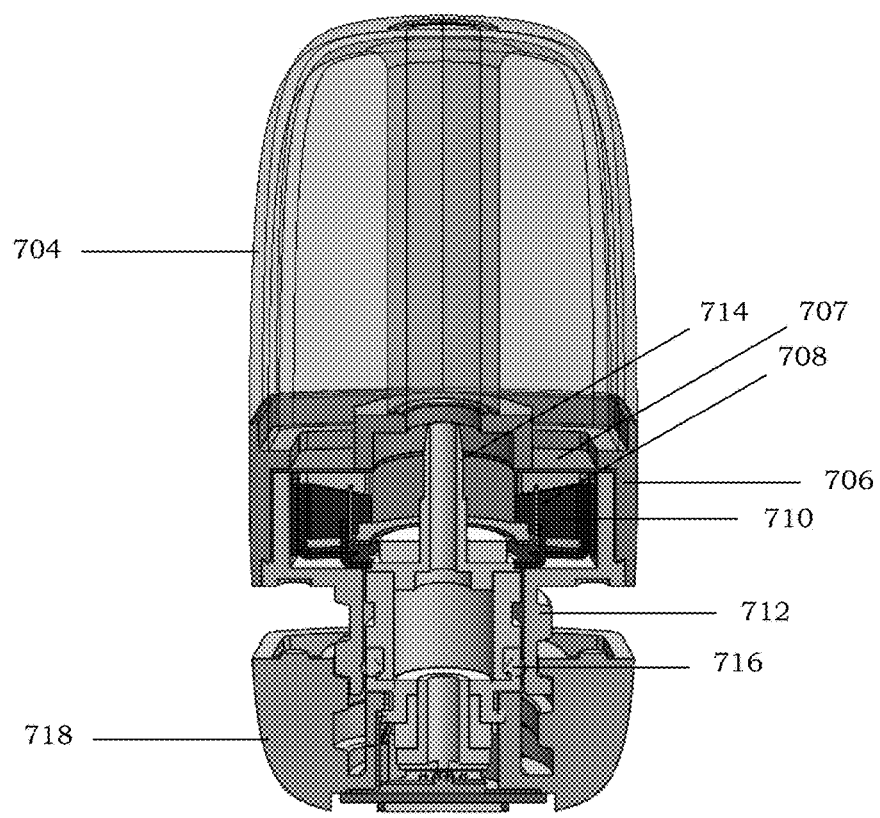
FIG. 27B is a tilted cross-sectional view of the pod assembly of FIG. 26 when assembled and before actuation.

FIG. 27A is a cross-sectional view of the pod assembly of FIG. 26 when assembled and before actuation. FIG. 27B is a tilted cross-sectional view of the pod assembly of FIG. 26 when assembled and before actuation. Referring to FIG. 27A and FIG. 27B, the upper pod case 704 is configured to connect with the cap 706, and the upper portion of the screw 712 is configured to be inserted into the cap 706. In an example embodiment, the outer side wall of the screw 712 interfaces with the inner side wall of the cap 706. The lower portion of the screw 712 is threadedly engaged with the lower pod case 718, and the threaded engagement is configured such that the lower pod case 718 can be rotated in a first direction to move upwards towards the upper pod case 704. The threaded engagement can also be configured so as to prevent the lower pod case 718 from becoming unscrewed or detached from the screw 712 when rotated in an opposite second direction.

Before actuation, the blade 710 may rest on the upper recessed surface of the screw 712 and/or a supporting ridge of the vaporizer 714. The vaporizer 714 is configured to move with the lower pod case 718. As a result, a rotation of the lower pod case 718 to move the lower pod case 718 will also move the vaporizer 714 (and the insert 716) with it. The size and shape of the central opening in the screw 712 is configured to permit the vaporizer 714 to move reversibly therein.

Figure 28A:
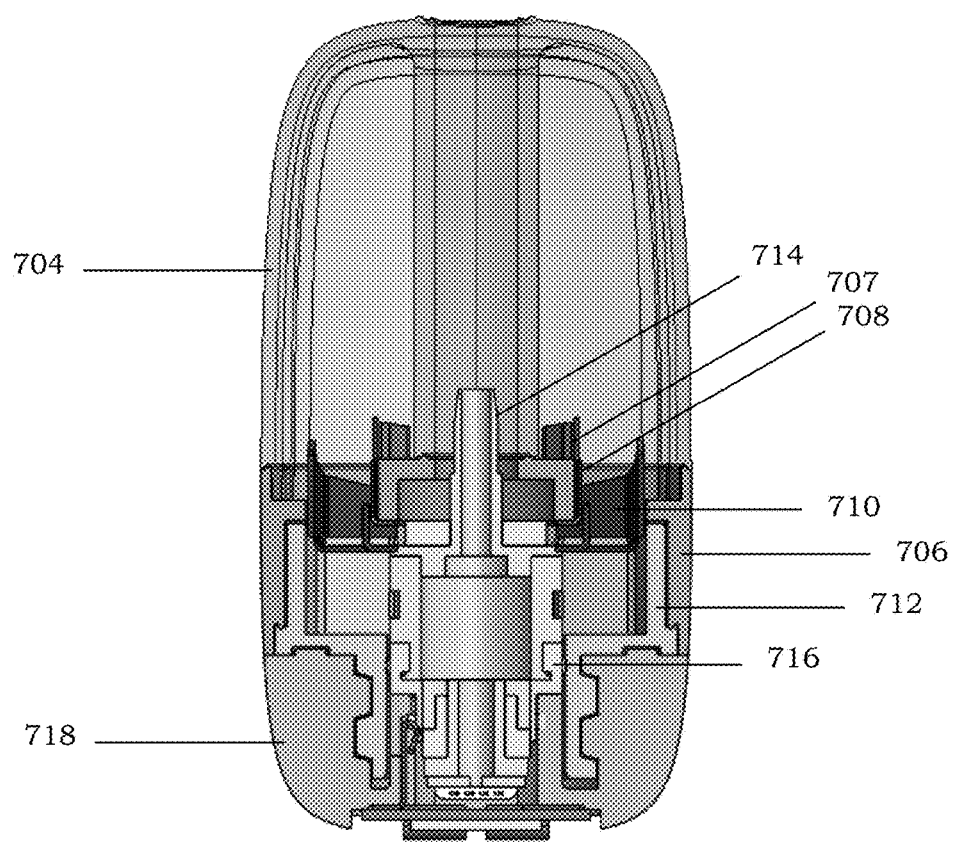
FIG. 28A is a cross-sectional view of the pod assembly of FIG. 26 when assembled and after actuation.
Figure 28B:
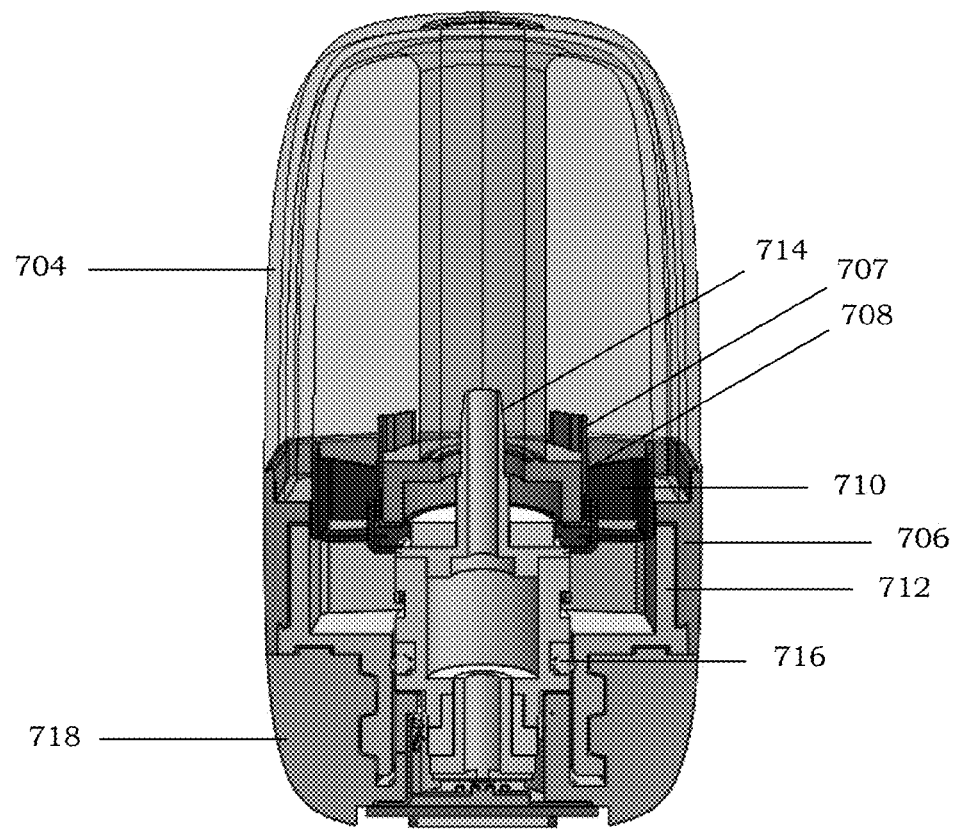
FIG. 28B is a tilted cross-sectional view of the pod assembly of FIG. 26 when assembled and after actuation.
Figure 28C:
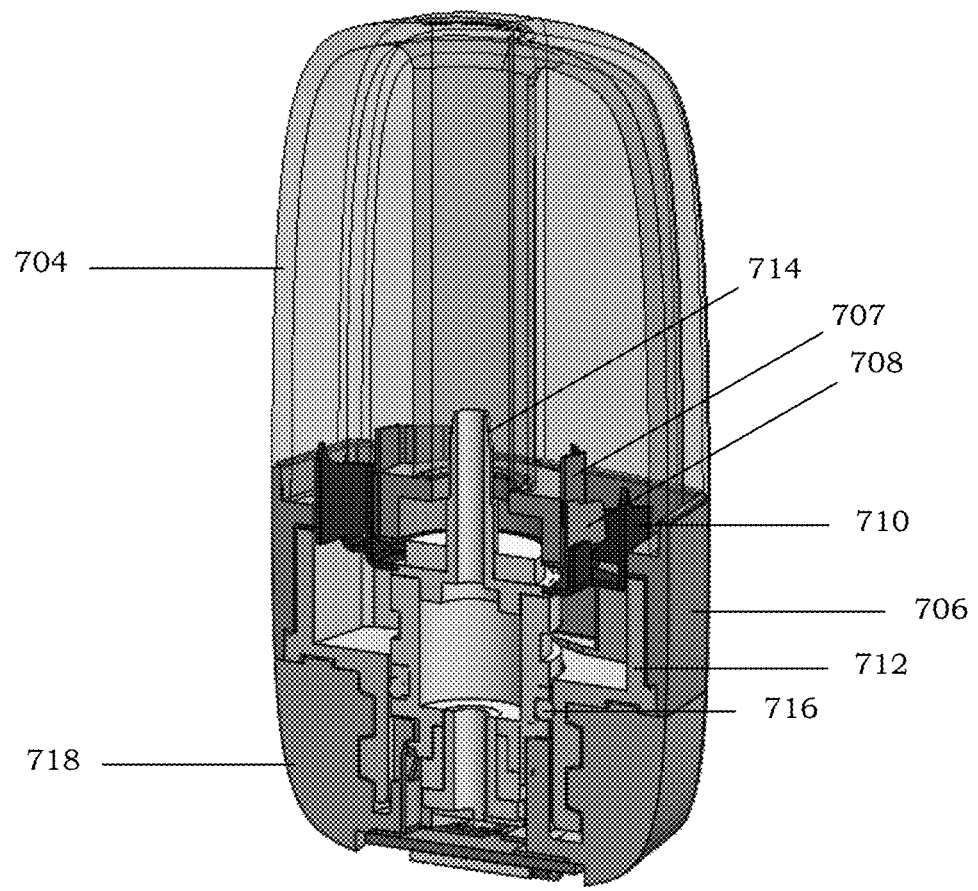
FIG. 28C is a tilted and angled cross-sectional view of the pod assembly of FIG. 26 when assembled and after actuation.

FIG. 28A is a cross-sectional view of the pod assembly of FIG. 26 when assembled and after actuation. FIG. 28B is a tilted cross-sectional view of the pod assembly of FIG. 26 when assembled and after actuation. FIG. 28C is a tilted and angled cross-sectional view of the pod assembly of FIG. 26 when assembled and after actuation. Referring to FIG. 28A, FIG. 28B, and FIG. 28C, the pod assembly 702 may be actuated by holding the upper pod case 704 and rotating the lower pod case 718 relative to the upper pod case 704. In such an instance, as a result of the rotation, the lower pod case 718 will travel along the threads of the screw 712 until the lower pod case 718 is adjacent to or abutting the undersurface of the screw 712. Conversely, the pod assembly 702 may be actuated by holding the lower pod case 718 and rotating the upper pod case 704 relative to the lower pod case 718. In such an instance, as a result of the rotation, the screw 712 will move into the lower pod case 718 until the undersurface of the screw 712 is adjacent to or abutting the lower pod case 718.

The pod assembly 702 may be configured such that the lower pod case 718 (or, conversely, the upper pod case 704) undergoes a 360 degree rotation to actuate the pod assembly 702. However, it should be understood that example embodiments are not limited thereto. For instance, the pod assembly 702 may be designed such that only a 180 degree rotation is needed for actuation. After the requisite rotation is performed, the upper pod case 704 will be adjacent to and aligned with the lower pod case 718 so as to result in a pod assembly 702 with relatively continuous front, side, and rear surfaces and, thus, a more compact form than the longer, unactuated state shown in FIG. 27A and FIG. 27B.

When the lower pod case 718 (or, conversely, the upper pod case 704) is rotated, the vaporizer 714 will move into the upper pod case 704. As a result, the blade 710 will also be axially displaced so as to be pushed into the upper pod case 704 by the supporting ridge of the vaporizer 714 so as to pierce and cut the foil 707, thereby releasing the pre-vapor formulation from the reservoir. The inner side wall of the upper portion of the screw 712 (within which the blade 710 is seated) may act as a guide for the axial displacement of the blade 710. The upper portion of the vaporizer 714 is configured to extend into the vapor channel within the upper pod case 704 in a snug fit manner.

In an example embodiment, the pod assembly 702 may be configured to produce an audible sound (e.g., click) to indicate to the adult vaper that the requisite amount of rotation has occurred and, thus, that the blade 710 has been pushed sufficiently inward for actuation. The pod assembly 702 may also be configured such that the upper pod case 704 and the lower pod case 718 will be locked in place so as to not rotate after actuation. For instance, the audible sound may coincide with the locking feature wherein both may be effectuated by a snap-fit type structure that is configured for rotational engagement.

During the actuation of the pod assembly 702, the blade 710 will pierce and cut the foil 707 so as to release the pre-vapor formulation from the reservoir. Additionally, the foil folder 708 folds the foil 707 back after (or concurrently with) the piercing and cutting by the blade 710. Furthermore, because of the snug fit of the vaporizer 714 with the upper pod case 704, the possibility of the released pre-vapor formulation leaking from the reservoir directly into the vapor channel after actuation can be reduced or prevented. The pod assembly 702 may be configured such that the pre-vapor formulation released from the reservoir will flow into the vaporizer 714 via a side opening. The vaporizer 714 includes a heater that will be in thermal and/or fluidic communication with the pre-vapor formulation after the pod assembly 702 is actuated. During vaping, the vaporizer 714 will be activated to heat the pre-vapor formulation to generate a vapor that will be drawn through the vapor channel of the upper pod case 704 when a negative pressure is applied to the mouthpiece of the e-vapor device.

Figure 29:
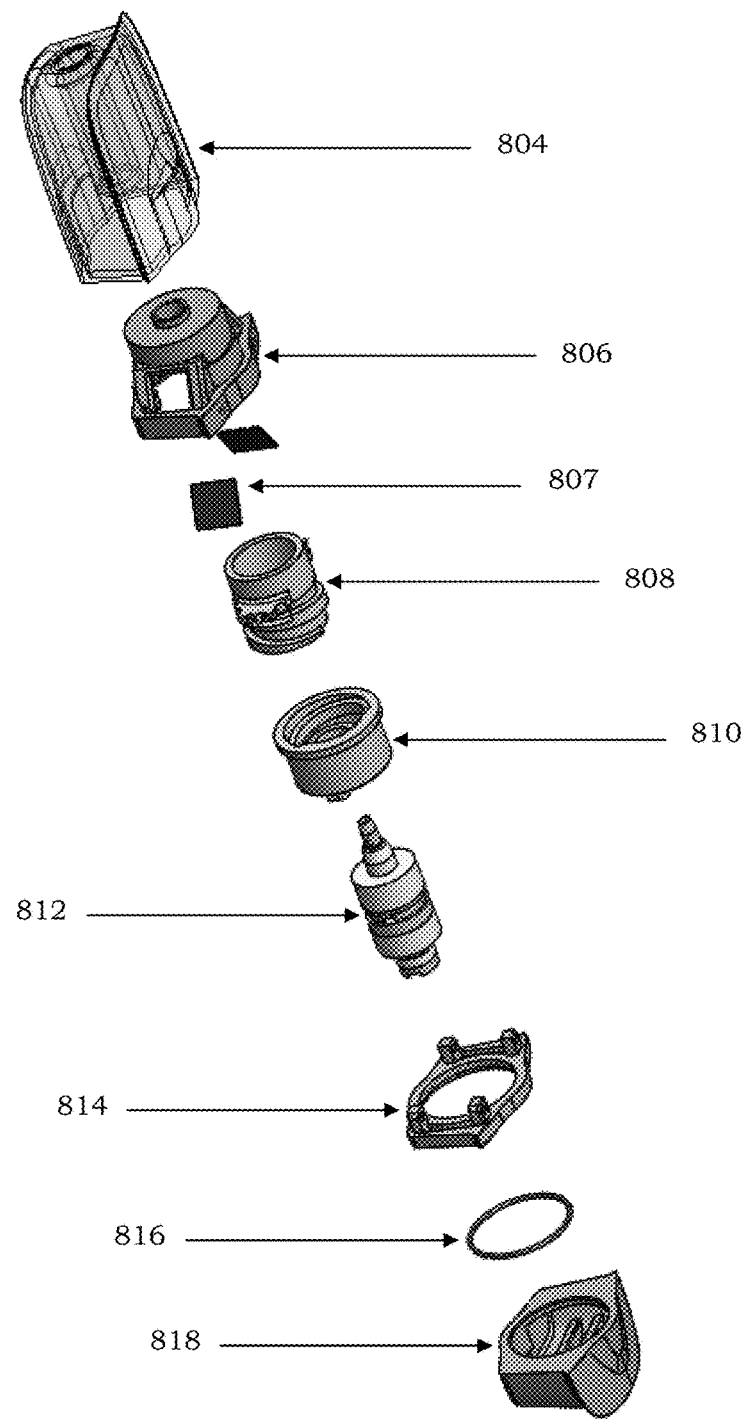
FIG. 29 is an exploded view of another pod assembly of an e-vapor apparatus according to an example embodiment.

FIG. 29 is an exploded view of another pod assembly of an e-vapor apparatus according to an example embodiment. Referring to FIG. 29, a twist and return mechanism is employed to actuate the pod assembly 802 prior to use. In an example embodiment, the pod assembly 802 includes an upper pod case 804, a foil holder 806, a foil 807, a cutter 808, a screw 810, a vaporizer 812, a brace 814, an O-ring 816, and a lower pod case 818.

The pod assembly 802 is configured to store a pre-vapor formulation within an internal, hermetically-sealed compartment so as to isolate the pre-vapor formulation from other internal elements until the pod assembly 802 is actuated for vaping. Because the pre-vapor formulation is isolated from the environment as well as the internal elements of the pod assembly 802 that may potentially react with the pre-vapor formulation, the possibility of adverse effects to the shelf-life and/or sensorial characteristics (e.g., flavor) of the pre-vapor formulation may be reduced or prevented. The internal, hermetically-sealed compartment within the pod assembly 802 may be a reservoir defined by the upper pod case 804, the foil holder 806, and the foil 807. In an example embodiment, the pod assembly 802 may be configured such that the foil 807 is integrated with the foil holder 806 for sealing the reservoir. Alternatively, the foil 807 may be included in the pod assembly 802 as a structure that is separate from the foil holder 806.

The cutter 808 is configured to pierce and cut the foil 807 in order to release the pre-vapor formulation from the reservoir during the actuation of the pod assembly 802. To effectuate the piercing and cutting, the cutter 808 may include a puncturing/perforating element that protrudes from its outer side wall. For instance, the puncturing/perforating element may be a pair of serrated structures arranged on opposite sides of the outer side wall of the cutter 808. However, it should be understood that example embodiments are not limited thereto.

When assembled, the vaporizer 812 will extend through the cutter 808, and both structures will be between the foil holder 806 and the screw 810. The cutter 808 is configured to be threadedly engaged with the screw 810. The brace 814 is configured to engage with a bottom section of the foil holder 806. The engagement of the brace 814 with the foil holder 806 may be achieved via a snap-fit connection, a friction fit connection, an adhesive, or other suitable coupling technique. The outer diameter of the rim of the screw 810 is larger than the diameter of the opening in the brace 814 due to the presence of the lip on the screw 810. The screw 810 is configured to be seated within the lower pod case 818. In an example embodiment, the bottom of the screw 810 includes a ridge structure that is received within a groove in the lower pod case 818. As a result, a rotation of the lower pod case 818 will cause the screw 810 to also rotate. In this regard, in addition to the groove/ridge structure example above, it should be understood that other suitable options may be employed to engage the screw 810 with the lower pod case 818.

Figure 30A:
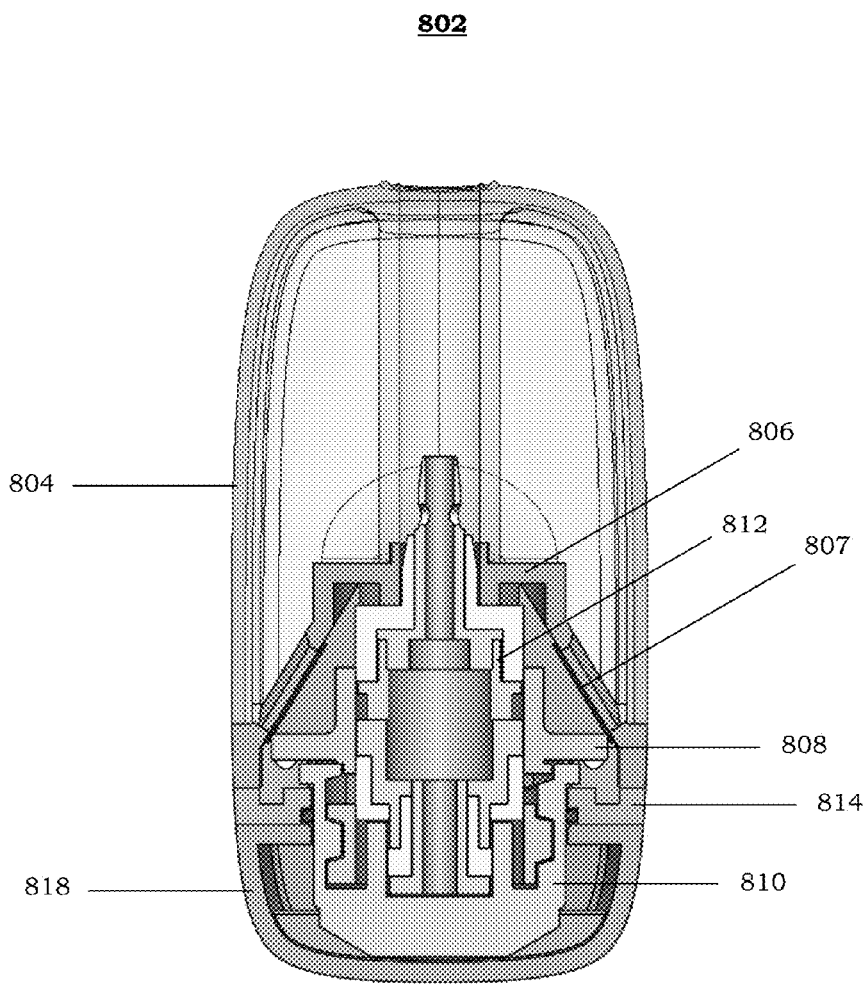
FIG. 30A is a cross-sectional view of the pod assembly of FIG. 29 when assembled and before actuation.
Figure 30B:
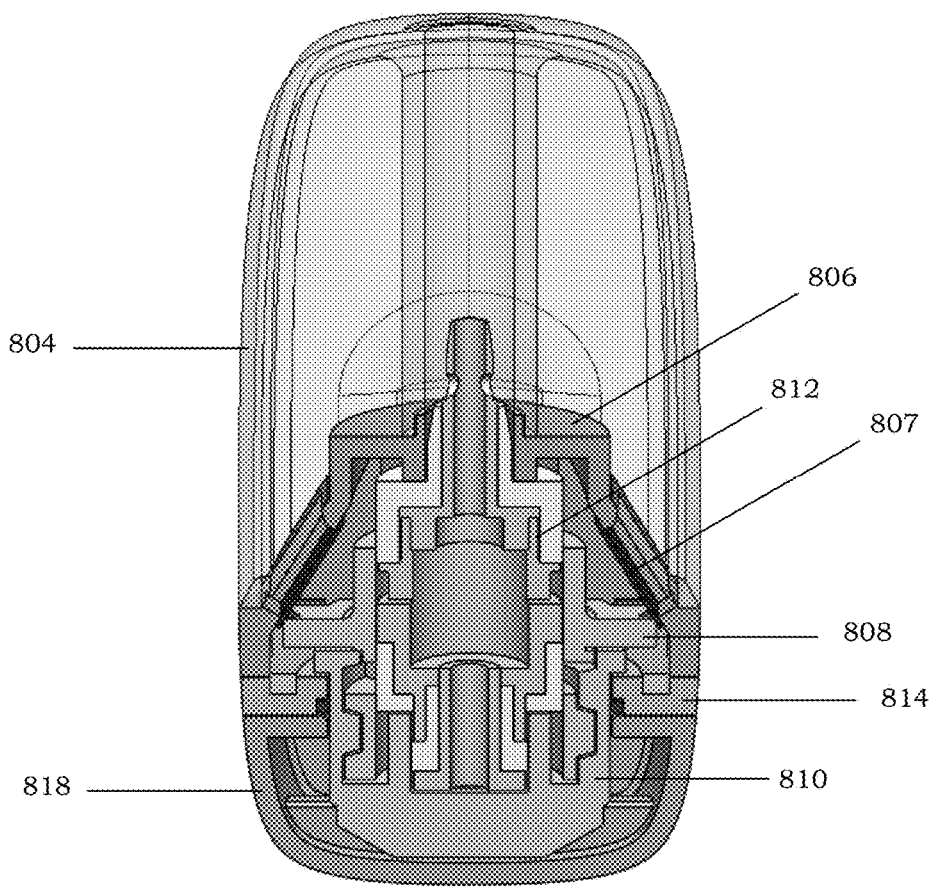
FIG. 30B is a tilted cross-sectional view of the pod assembly of FIG. 29 when assembled and before actuation.
Figure 30C:
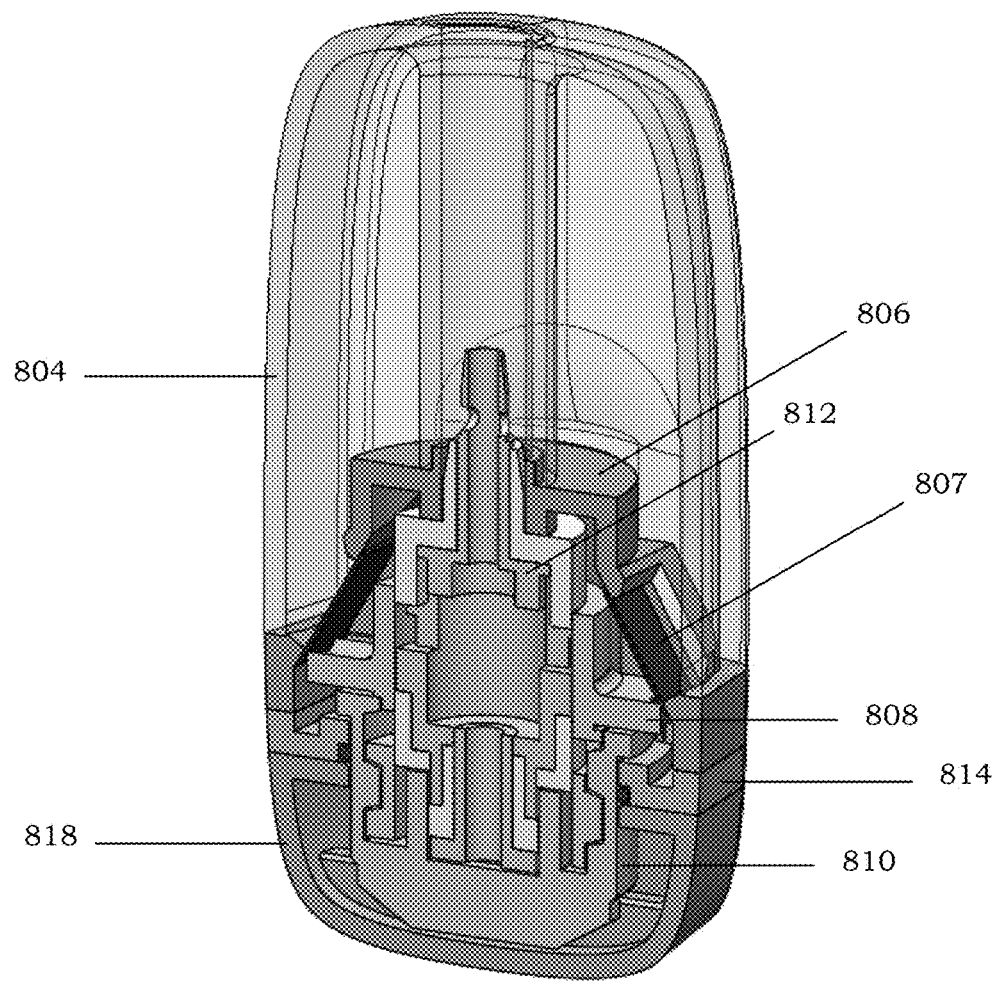
FIG. 30C is a tilted and angled cross-sectional view of the pod assembly of FIG. 29 when assembled and before actuation.

FIG. 30A is a cross-sectional view of the pod assembly of FIG. 29 when assembled and before actuation. FIG. 30B is a tilted cross-sectional view of the pod assembly of FIG. 29 when assembled and before actuation. FIG. 30C is a tilted and angled cross-sectional view of the pod assembly of FIG. 29 when assembled and before actuation. Referring to FIG. 30A, FIG. 30B, and FIG. 30C, the upper pod case 804 is configured to connect with the foil holder 806. The foil 807 is secured to each of the angled faces of the foil holder 806 so as to cover the openings in the angled faces. The foil 807 is designed to hermetically seal the reservoir until the pod assembly 802 is actuated. The vaporizer 812 extends through the cutter 808 and the foil holder 806 such that a tip portion of the vaporizer 812 protrudes into a vapor channel within the upper pod case 804. The cutter 808 is threadedly engaged with the screw 810, and the screw 810 is seated within the lower pod case 818. The threaded engagement between the cutter 808 and the screw 810 may be configured such that the cutter 808 will move upwards towards the upper pod case 804 when the screw 810 is rotated (via the lower pod case 818) in a first direction. Conversely, in such an example embodiment, the threaded engagement may be configured such that the cutter 808 will move downwards to its original position and, thus, towards the lower pod case 818 when the screw 810 is rotated (via the lower pod case 818) in an opposite second direction.

When the pod assembly 802 is in an unactuated (or resealed) state, as shown in FIG. 30A, FIG. 30B, and FIG. 30C, the cutter 808 will be adjacent to or abutting the bottom of the inner, recessed surface of the screw 810. In this unactuated state, a side opening in the vaporizer 812 (through which a pre-vapor formulation will enter after actuation) will be covered by the cutter 808. In an example embodiment, the inner surface of the cutter 808 may also be lined with a film or layer (e.g., silicone film) that is impervious to pre-vapor formulation in order to help close the side opening of the vaporizer 812 when entry of the pre-vapor formulation is not desired, such as when the pod assembly 802 has been resealed after actuation (which will be subsequently discussed in further detail).

The pod assembly 802 may be actuated by holding the upper pod case 804 and rotating the lower pod case 818 relative to the upper pod case 804. Alternatively, the pod assembly 802 may be actuated by holding the lower pod case 818 and rotating the upper pod case 804 relative to the lower pod case 818. In addition, the pod assembly 802 may be configured such that the lower pod case 818 (or, alternatively, the upper pod case 804) undergoes a 360 degree rotation to actuate the pod assembly 802. However, it should be understood that example embodiments are not limited thereto. For instance, the pod assembly 802 may be designed such that only a 180 degree rotation is needed for actuation. During actuation, the above-discussed rotation will cause the cutter 808 to move upwards so as to pierce and cut the foil 807 covering each of the openings in the angled faces of the foil holder 806, which will thereby release the pre-vapor formulation from the reservoir.

Figure 31A:
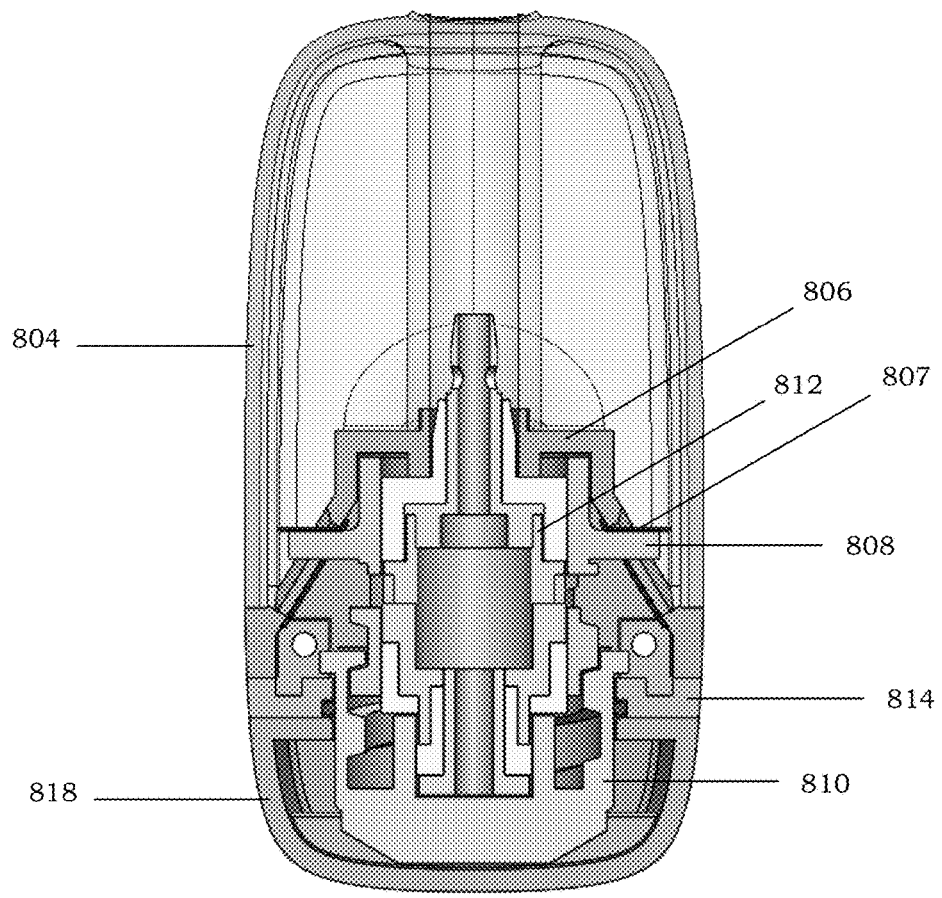
FIG. 31A is a cross-sectional view of the pod assembly of FIG. 29 when assembled and after actuation.
Figure 31B:
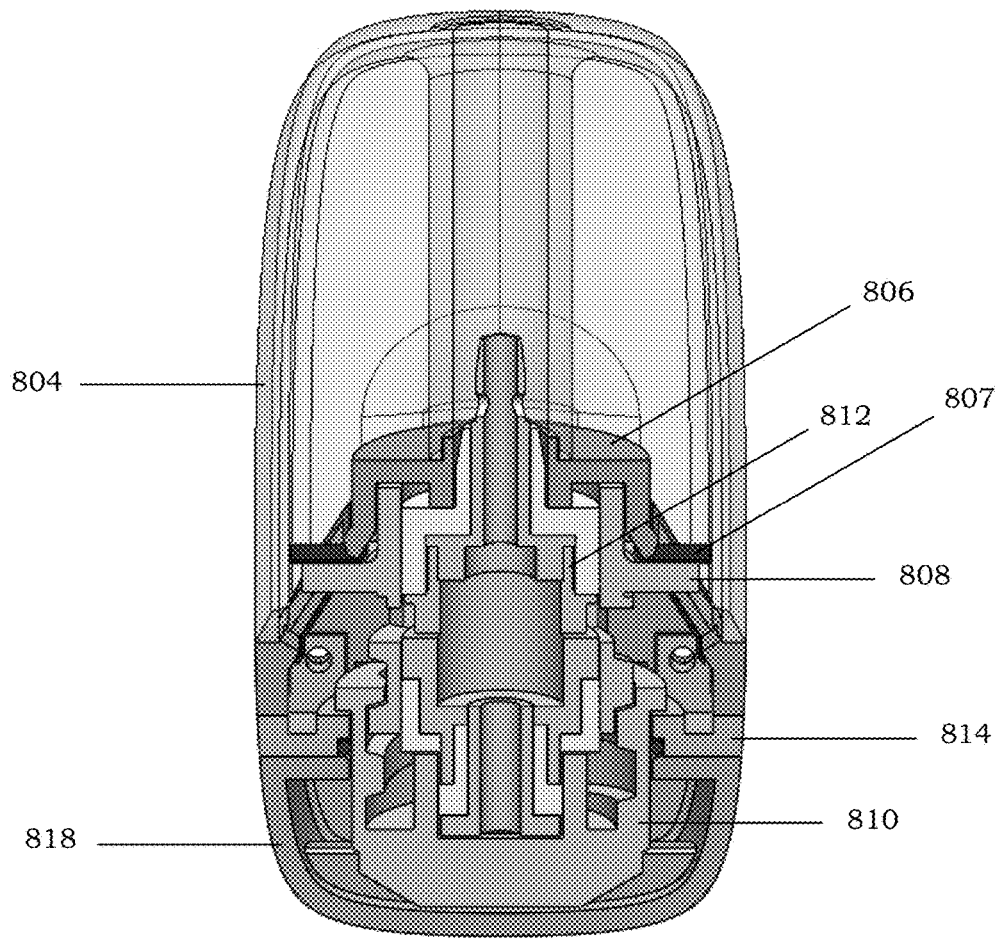
FIG. 31B is a tilted cross-sectional view of the pod assembly of FIG. 29 when assembled and after actuation.
Figure 31C:
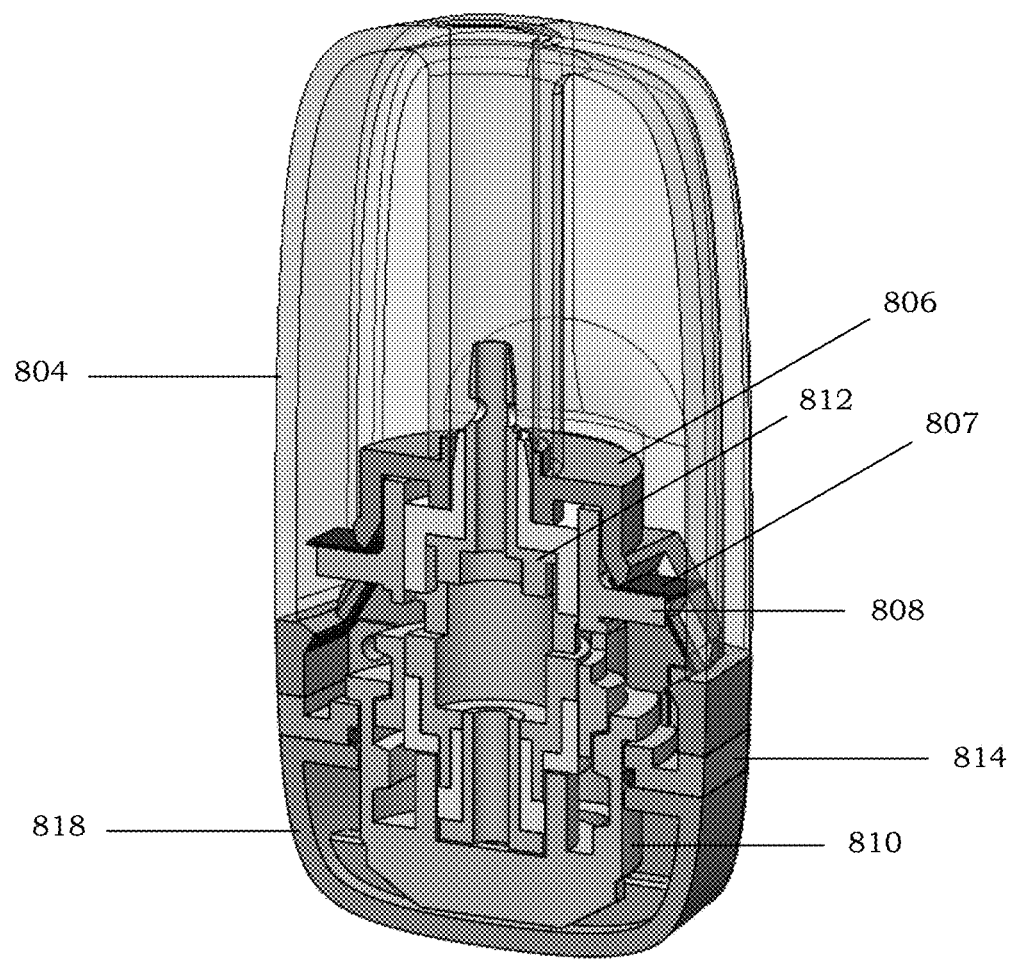
FIG. 31C is a tilted and angled cross-sectional view of the pod assembly of FIG. 29 when assembled and after actuation.

FIG. 31A is a cross-sectional view of the pod assembly of FIG. 29 when assembled and after actuation. FIG. 31B is a tilted cross-sectional view of the pod assembly of FIG. 29 when assembled and after actuation. FIG. 31C is a tilted and angled cross-sectional view of the pod assembly of FIG. 29 when assembled and after actuation. Referring to FIG. 31A, FIG. 31B, and FIG. 31C, when the pod assembly 802 is in an actuated state, the cutter 808 will be adjacent to or abutting the underside of the foil holder 806. As a result, the puncturing/perforating elements on the outer side wall of the cutter 808 will protrude through the openings in the angled faces of the foil holder 806, thereby piercing and cutting the associated foils 807 so as to release the pre-vapor formulation from the reservoir. In addition, the side opening in the vaporizer 812 will be aligned with a side opening in the cutter 808 to permit the entry of the pre-vapor formulation released from the reservoir into the vaporizer 812 via the aligned side openings. The vaporizer 812 includes a heater that will be in thermal and/or fluidic communication with the released pre-vapor formulation after the pod assembly 802 is actuated. During vaping, the vaporizer 812 will be activated to heat the pre-vapor formulation to generate a vapor that will be drawn through the vapor channel of the upper pod case 804 when a negative pressure is applied to the mouthpiece of the e-vapor device.

The actuated pod assembly 802 may also be switched from being open (FIG. 31A, FIG. 31B, and FIG. 31C) back to being closed (FIG. 30A, FIG. 30B, and FIG. 30C) by changing the position of the cutter 808. In this context, the term "open" should be understood to mean a state where the side opening of the vaporizer 812 is not covered by the cutter 808. In contrast, the term "closed" should be understood to mean a state where the side opening of the vaporizer 812 is covered/resealed. The pod assembly 802 may be closed by moving the cutter 808 back down to its original position to cover/reseal the side opening of the vaporizer 812. The return of the cutter 808 to its original position (towards the lower pod case 818) can be effectuated by rotating the screw 810 (via the lower pod case 818) in the opposite second direction to thereby cover/reseal the side opening of the vaporizer 812. The cutter 808 may be regarded as a shuttle-type structure due to its ability to move up and down in order to switch the pod assembly 802 from being closed to being open or vice versa. When resealed, the entry of further pre-vapor formulation into the vaporizer 812 may be precluded. As a result, the pod assembly 802 can be stored with a reduced risk of leakage.

Figure 32:
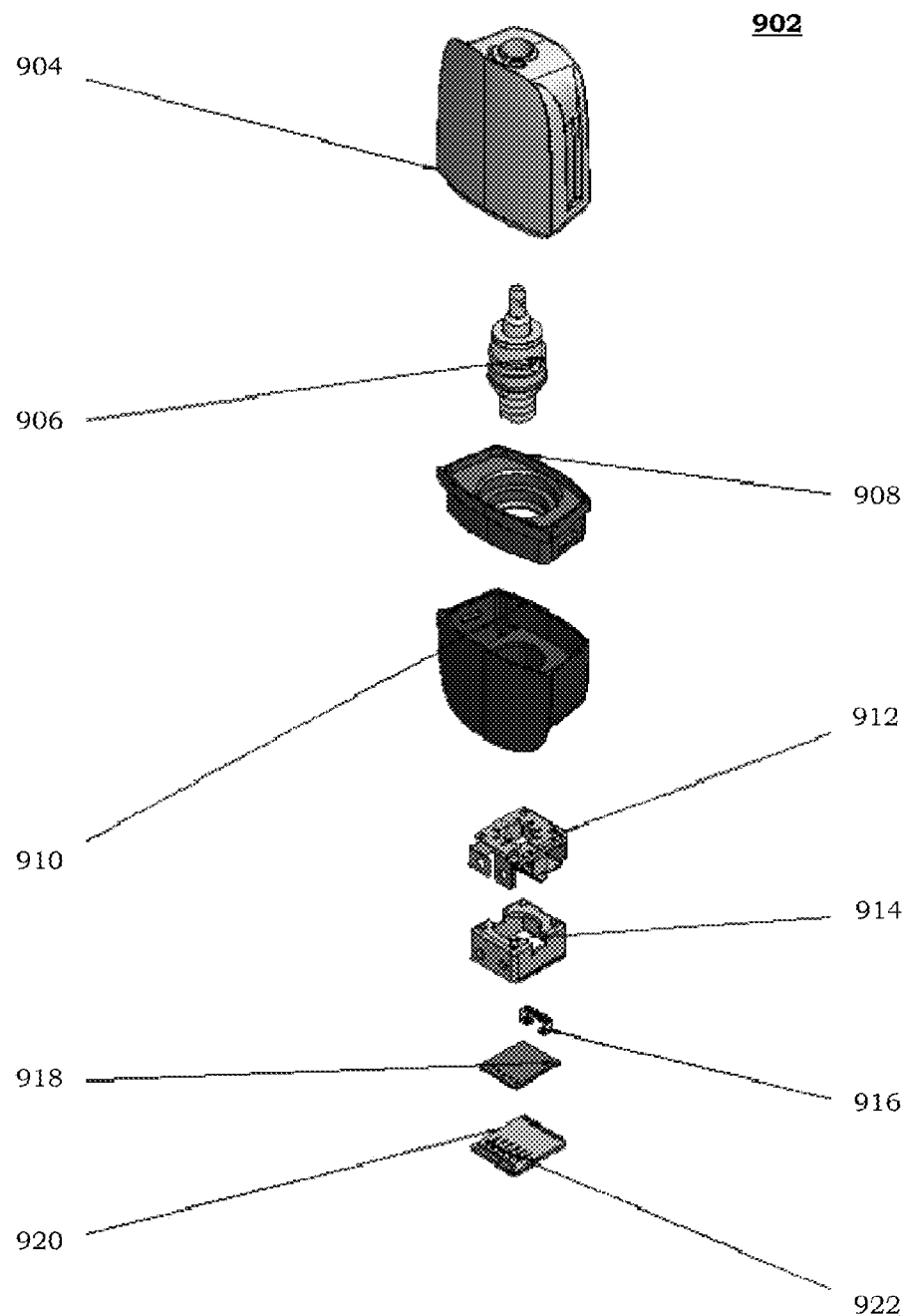
FIG. 32 is an exploded view of another pod assembly of an e-vapor apparatus according to an example embodiment.

FIG. 32 is an exploded view of another pod assembly of an e-vapor apparatus according to an example embodiment. Referring to FIG. 32, the pod assembly 902 has a simplified pod construction. In an example embodiment, the pod assembly 902 includes an upper pod case 904, a vaporizer 906, a seal 908, a lower pod case 910, electrical contacts 912, a connector case 914, a sensor 916, a printed circuit board (PCB) 918, a data pin connector 920, and a data pin 922. The electrical contacts 912 and the data pin 922 may be formed of beryllium copper (BeCu). The connector case 914 and the data pin connector 920 may be formed of polybutylene terephthalate (PBT). The sensor 916 may be a flow sensor, and the flow sensor may be formed of a nickel-iron alloy.

Figure 33:
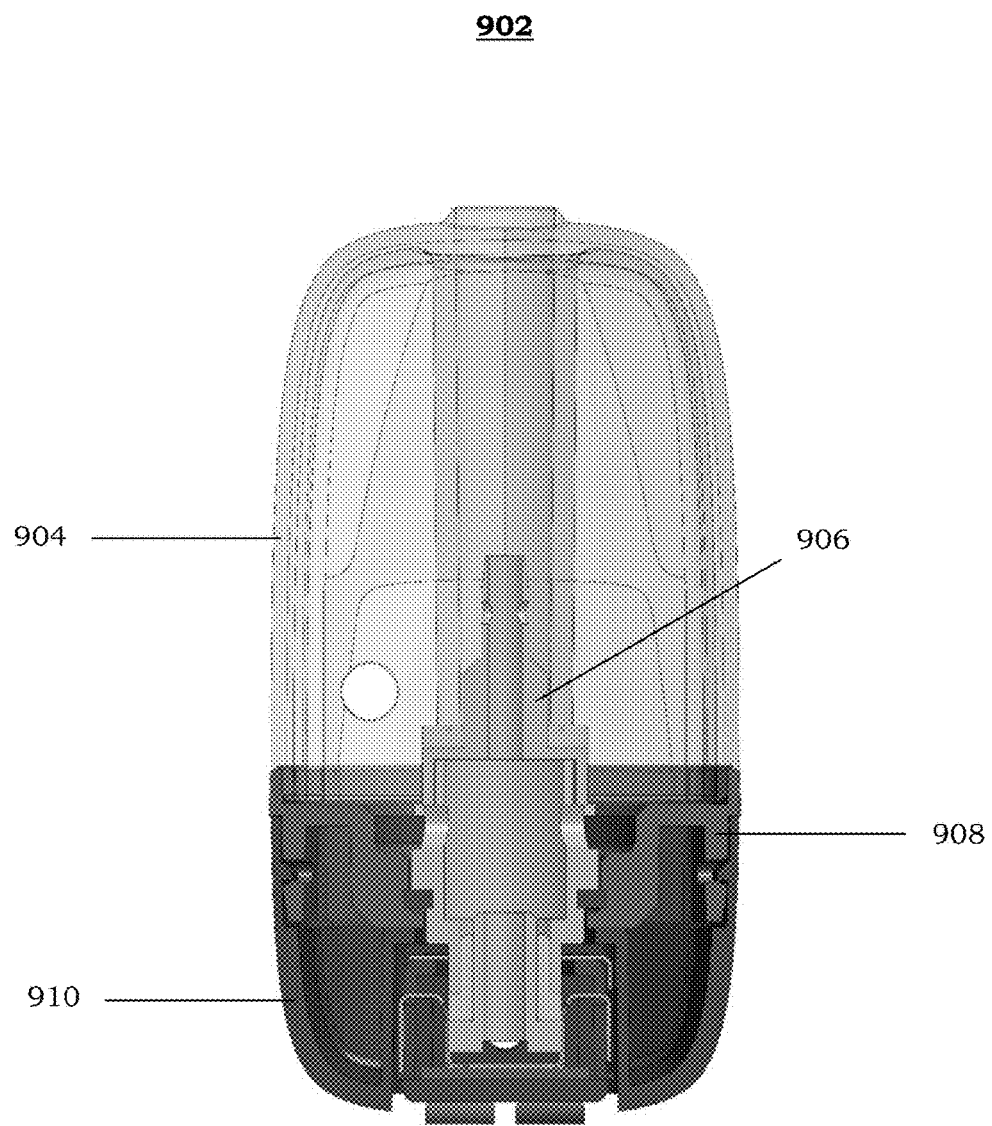
FIG. 33 is a cross-sectional view of the pod assembly of FIG. 32 when assembled.

FIG. 33 is a cross-sectional view of the pod assembly of FIG. 32 when assembled. Referring to FIG. 33, the pod assembly 902 includes an upper pod case 904 that is configured to connect with the lower pod case 910 via the seal 908. The pod assembly 902 is configured such that a pre-vapor formulation stored therein is already in thermal and/or fluidic communication with a heater within the vaporizer 906. As a result, no actuation is needed to internally release the pre-vapor formulation prior to inserting the pod assembly 902 into a dispensing body of an e-vapor device. However, it should be understood that the other internal elements of the pod assembly 902 (e.g., electronics) may be isolated from the pre-vapor formulation by virtue of at least the seal 908. The sector of the pod assembly 902 above the seal 908 may be regarded as the pre-vapor formulation compartment, while the sector of the pod assembly 902 below the seal 908 may be regarded as the device compartment. During vaping, the vaporizer 906 will be activated to heat the pre-vapor formulation to generate a vapor that will be drawn through the vapor channel of the upper pod case 904 when a negative pressure is applied to the mouthpiece of the e-vapor device.

Figure 34:
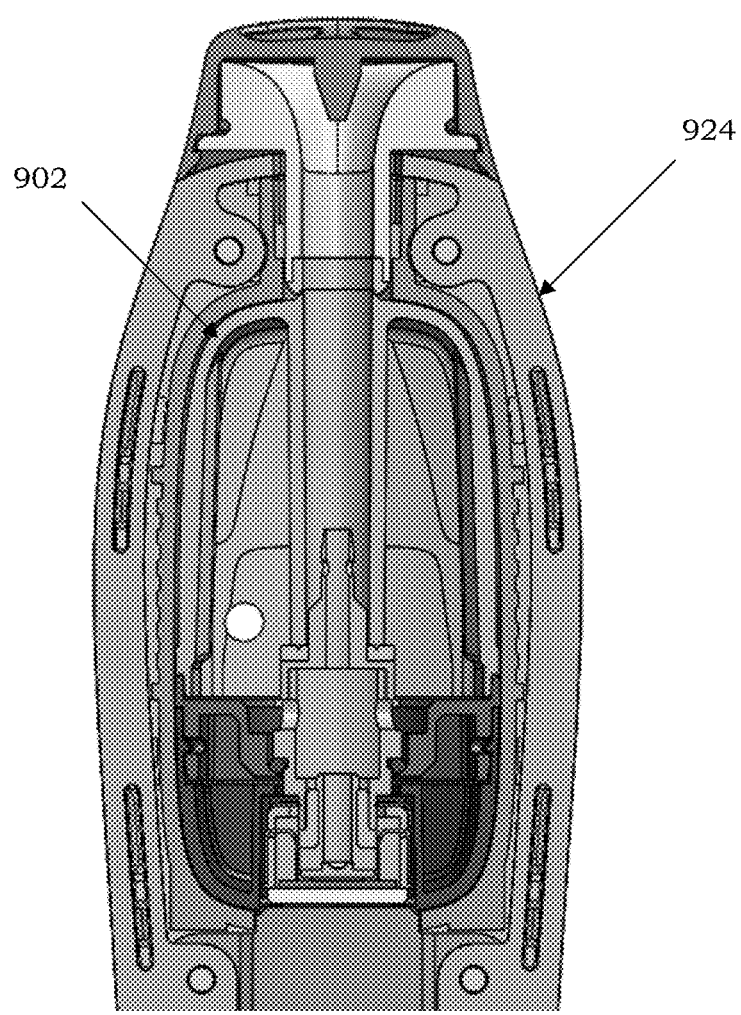
FIG. 34 is a partial view of an e-vapor apparatus with the pod assembly of FIG. 33 inserted in a dispensing body according to an example embodiment.

FIG. 34 is a partial view of an e-vapor apparatus with the pod assembly of FIG. 33 inserted in a dispensing body according to an example embodiment. Referring to FIG. 34, the pod assembly 902 may be held within the dispensing body 924 in a variety of ways. In an example embodiment, a mouthpiece seal may secure a top portion of the pod assembly 902, while an electrical connector may secure a bottom portion of the pod assembly 902 and act as an electrical interface between the pod assembly 902 and the dispensing body 924. The mouthpiece seal may be formed of silicone and acts as a vapor interface between the vapor channel of the pod assembly 902 and the vapor passage of the dispensing body 924 so as to facilitate a delivery of the vapor through the vapor passage of the dispensing body 924 when a negative pressure is applied to the mouthpiece.

The mouthpiece of the dispensing body 924 may have different parts and configurations for aesthetic reasons (e.g., outer piece to complement the look and feel of the e-vapor device) and/or for functional reasons (e.g., inner piece to adjust the temperature of the vapor and/or to reduce the turbulence of the vapor). Thus, a number of different mouthpieces may be utilized with the e-vapor device depending on the preferences of an adult vaper. In this regard, the mouthpiece is designed to be removable and interchangeable (e.g., via a bayonet connection). Alternative configurations for the mouthpiece are disclosed in U.S. application Ser. No. 29/575,895, the entire contents of which are incorporated herein by reference. In addition, alternative configurations for the dispensing body are disclosed in U.S. application Ser. No. 29/575,887, the entire contents of which are incorporated herein by reference. Alternative configurations for the pod assembly are also disclosed in U.S. application Ser. No. 29/575,881, the entire contents of which are incorporated herein by reference. Furthermore, alternative configurations for the overall e-vapor device are disclosed in U.S. application Ser. No. 29/575,883, the entire contents of which are incorporated herein by reference. Based on the present teachings and although not necessarily set forth expressly herein, it should be appreciated that various features and combinations from one embodiment may be suitable and applicable for other embodiments depending on the desired effects provided by such features and combinations.

While a number of example embodiments have been disclosed herein, it should be understood that other variations may be possible. Such variations are not to be regarded as a departure from the spirit and scope of the present disclosure, and all such modifications as would be obvious to one skilled in the art are intended to be included within the scope of the following claims.

The invention claimed is:

1. An e-vapor apparatus comprising:
 a pod assembly including a pre-vapor formulation compartment, a device compartment, and a vapor channel traversing the pre-vapor formulation compartment, the pre-vapor formulation compartment configured to hold a pre-vapor formulation therein;
 a dispensing body including a proximal portion and an opposing distal portion, the proximal portion including a vapor passage and a through-hole, the through-hole being between the vapor passage and the distal portion of the dispensing body, the through-hole configured to receive the pod assembly; and
 a vaporizer disposed in at least one of the pod assembly and the dispensing body, the pre-vapor formulation compartment of the pod assembly configured to be in fluidic communication with the vaporizer during an operation of the e-vapor apparatus, the vaporizer configured to heat the pre-vapor formulation to produce a vapor that passes through the pod assembly via the vapor channel.

2. The e-vapor apparatus of claim 1, wherein the pre-vapor formulation compartment of the pod assembly surrounds the vapor channel.

3. The e-vapor apparatus of claim 1, wherein the vapor channel passes through a center of the pre-vapor formulation compartment.

4. The e-vapor apparatus of claim 1, wherein the vapor channel is in a form of a pathway that is arranged along at least one sidewall of the pre-vapor formulation compartment.

5. The e-vapor apparatus of claim 1, wherein the vapor channel is in a form of a conduit that is arranged in at least one corner of the pre-vapor formulation compartment.

6. The e-vapor apparatus of claim 5, wherein the conduit is arranged in at least two corners of the pre-vapor formulation compartment and configured to converge at a position that is aligned with the vapor passage of the dispensing body when the pod assembly is received in the through-hole.

7. The e-vapor apparatus of claim 1, wherein the pre-vapor formulation compartment and the device compartment are at opposite ends of the pod assembly.

8. The e-vapor apparatus of claim 1, wherein the device compartment of the pod assembly includes a memory device.

9. The e-vapor apparatus of claim 8, wherein the memory device is coded with an electronic identity to permit at least one of an authentication of the pod assembly and a pairing of operating parameters specific to a type of the pod assembly when the pod assembly is inserted into the through-hole of the dispensing body, the memory device configured to receive and store information from the dispensing body during the operation of the e-vapor apparatus.

10. The e-vapor apparatus of claim 1, wherein the pod assembly includes a side surface having at least one electrical contact.

11. The e-vapor apparatus of claim 10, wherein the dispensing body is configured to perform at least one of supply power to and communicate with the pod assembly via the at least one electrical contact.

12. The e-vapor apparatus of claim 10, wherein the at least one electrical contact is at an end of the pod assembly corresponding to the device compartment.

13. The e-vapor apparatus of claim 1, wherein dimensions of the through-hole correspond to dimensions of the pod assembly.

14. The e-vapor apparatus of claim 1, wherein the proximal portion of the dispensing body includes a mouthpiece that includes the vapor passage.

15. The e-vapor apparatus of claim 14, wherein the vapor channel is between the mouthpiece and the device compartment when the pod assembly is inserted into the through-hole of the dispensing body.

16. The e-vapor apparatus of claim 1, further comprising:
 an attachment structure on at least one of a side wall of the through-hole and a side surface of the pod assembly, the attachment structure configured to engage and hold the pod assembly upon insertion into the through-hole of the dispensing body.

17. A pod assembly for an e-vapor apparatus, comprising:
 a pre-vapor formulation compartment configured to hold a pre-vapor formulation therein, the pre-vapor formulation compartment including a front face and a rear face opposite the front face, the front face and the rear face being transparent;
 a device compartment configured to be in fluidic communication with the pre-vapor formulation compartment; and
 a vapor channel extending through the pre-vapor formulation compartment, the vapor channel being visible through the pre-vapor formulation, the front face, and the rear face.

18. The pod assembly of claim 17, wherein the device compartment includes a vaporizer.

19. The pod assembly of claim 17, wherein the device compartment includes a memory device, and a side surface of the pod assembly includes at least one electrical contact.

20. A pod assembly for an e-vapor apparatus, comprising:
 a pre-vapor formulation compartment configured to hold a pre-vapor formulation therein, the pre-vapor formulation compartment including a front face and a rear face opposite the front face, the front face and the rear face being transparent;
 a vaporizer configured to be in fluidic communication with the pre-vapor formulation compartment; and
 a vapor channel extending from the vaporizer and through the pre-vapor formulation compartment, the vapor channel being visible through the pre-vapor formulation, the front face, and the rear face.

* * * * *